US012784762B2

(12) United States Patent
Yamabe

(10) Patent No.: US 12,784,762 B2
(45) Date of Patent: Nov. 3, 2026

(54) SOUND COLLECTING DEVICE, SOUND COLLECTING METHOD, AND SOUND COLLECTING PROGRAM

(71) Applicant: JVCKENWOOD CORPORATION, Yokohama (JP)

(72) Inventor: Takaaki Yamabe, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 192 days.

(21) Appl. No.: 18/677,136

(22) Filed: May 29, 2024

(65) Prior Publication Data

US 2024/0312475 A1 Sep. 19, 2024

Related U.S. Application Data

(63) Continuation of application No. PCT/JP2022/033098, filed on Sep. 2, 2022.

(30) Foreign Application Priority Data

Nov. 30, 2021 (JP) ................................ 2021-194233
Jan. 19, 2022 (JP) ................................ 2022-006136

(51) Int. Cl.
*G10L 21/0232* (2013.01)
*G10L 21/0208* (2013.01)

(52) U.S. Cl.
CPC *G10L 21/0232* (2013.01); *G10L 2021/02082* (2013.01)

(58) Field of Classification Search
None
See application file for complete search history.

(56) References Cited

U.S. PATENT DOCUMENTS

| | | | | |
|---|---|---|---|---|
| 5,933,506 A * | 8/1999 | Aoki | H04R 3/005 | |
| | | | 381/94.1 | |
| 2015/0319528 A1* | 11/2015 | Gao | H04R 3/005 | |
| | | | 381/71.7 | |
| 2024/0203437 A1* | 6/2024 | Yang | G10L 21/0208 | |

FOREIGN PATENT DOCUMENTS

| | | |
|---|---|---|
| JP | 2000-261534 A | 9/2000 |
| JP | 2007-60429 A | 3/2007 |
| JP | 2007-251354 A | 9/2007 |
| JP | 2014502468 A | 1/2014 |

(Continued)

*Primary Examiner* — Paras D Shah
*Assistant Examiner* — Ali M Hassan
(74) *Attorney, Agent, or Firm* — Nath, Goldberg & Meyer; Jerald L. Meyer

(57) ABSTRACT

A microphone generates a voice signal based on air vibration. A vibration sensor generates a vibration signal based on vibration transmitted to a human body. An adaptive filter multiplies the vibration signal by a coefficient to generate a converted voice signal. A subtractor generates a residual signal that is a difference between the voice signal and the converted voice signal. The adaptive controller controls the adaptive filter to update the coefficient so that the residual signal becomes small at a first speed when it is determined to be a voice section, and controls the adaptive filter to update the coefficient so that the residual signal becomes small at a second speed slower than the first speed when it is determined to be a non-audio section, or supplies the adaptive filter control signal to the adaptive filter to control not to update the coefficient.

10 Claims, 18 Drawing Sheets

(56) References Cited

FOREIGN PATENT DOCUMENTS

| | | | |
|---|---|---|---|
| JP | 5874344 | A | 3/2016 |
| JP | 5948918 | A | 7/2016 |

* cited by examiner

FIG. 5

| PATTERN | VOICE SECTION DETECTION | ENVIRONMENTAL NOISE LEVEL | LEARNING SPEED |
|---|---|---|---|
| #1 | OFF | LOW | SAVING |
| #2 | ON | LOW | ACTIVE |
| #3 | OFF | HIGH | SAVING |
| #4 | ON | HIGH | SAVING |

FIG. 6

| PATTERN | VOICE SECTION DETECTION | CORRELATION DEGREE | LEARNING SPEED |
|---|---|---|---|
| #5 | OFF | HIGH | SAVING |
| #6 | ON | HIGH | ACTIVE |
| #7 | OFF | LOW | SAVING |
| #8 | ON | LOW | SAVING |

SOUND COLLECTING DEVICE, SOUND COLLECTING METHOD, AND SOUND COLLECTING PROGRAM

CROSS-REFERENCE TO RELATED APPLICATIONS

This application is a continuation of PCT Application No. PCT/JP2022/033098, filed on Sep. 2, 2022, and claims the priority of Japanese Patent Application No. 2021-194233, filed on Nov. 30, 2021, and Japanese Patent Application No. 2022-006136, filed on Jan. 19, 2022, the entire contents of all of which are incorporated herein by reference.

BACKGROUND

The present disclosure relates to a sound collecting device, a sound collecting method, and a sound collecting program.

Japanese Unexamined Patent Application Publication No. 2007-251354 (Patent Literature 1) and Japanese Unexamined Patent Application Publication No. 2000-261534 (Patent Literature 2) describe a sound collecting device capable of obtaining clear voice in a noisy environment by providing a microphone for generating a voice signal based on air vibration and a vibration sensor for generating a vibration signal corresponding to a voice signal based on bone vibration. The former microphone may be referred to as an air conduction microphone, and the latter vibration sensor may be referred to as a bone conduction microphone.

The sound collecting device according to Patent Literature 1 includes a filtering unit for converting a vibration signal generated by the vibration sensor into a voice signal, and outputs a voice signal based on the vibration signal generated by the vibration sensor even under quiet conditions. The sound collecting device described in Patent Literature 1 is configured to update a filter coefficient of the filtering unit so that an error signal, which is a difference between a voice signal output from the filtering unit and a voice signal generated by a microphone, becomes small.

The sound collecting device described in Patent Literature 2 mixes a voice signal generated by a microphone and a vibration signal generated by a vibration sensor at a predetermined mixing ratio. The sound collecting device described in Patent Literature 2 is configured to increase the ratio of the voice signal generated by the microphone under quiet conditions and increase the ratio of the vibration signal generated by the vibration sensor under noisy conditions.

SUMMARY

The sound collecting device preferably outputs the voice signal generated by the microphone under quiet conditions, since there is a difference in the quality of the voice signal between the voice signal generated by the microphone and the voice signal based on the vibration signal generated by the vibration sensor. In Patent Literature 1, it is intended to improve the quality of the voice signal based on the vibration signal by updating the filter coefficient of the filtering unit so that the error signal becomes small. However, for example, in a noisy environment, the voice signal generated by the microphone includes environmental noise, and it may not be possible to improve the quality of the voice signal based on the vibration signal. Therefore, an improvement is required.

A first aspect of one or more embodiments provides a sound collecting device including: a microphone configured to generate a first voice signal based on air vibration; a vibration sensor configured to generate a vibration signal based on vibration transmitted to a human body by speech; an adaptive filter configured to set the first voice signal as a target signal, and to generate a converted voice signal by multiplying the vibration signal by a coefficient to bring the vibration signal closer to the target signal; a subtractor configured to generate a residual signal that is a difference between the target signal and the converted voice signal; and an adaptive controller configured to control the adaptive filter to update the coefficient to be multiplied by the vibration signal so that the residual signal becomes small, wherein when it is determined to be a voice section where voice is present, the adaptive controller is configured to generate to supply to the adaptive filter an adaptive filter control signal that controls the adaptive filter to update the coefficient so that the residual signal becomes small at a first speed; and when it is determined to be a non-voice section where the voice is not present, the adaptive controller is configured to generate to supply to the adaptive filter an adaptive filter control signal that controls the adaptive filter to update the coefficient so that the residual signal becomes small at a second speed slower than the first speed, or not to update the coefficient.

A second aspect of one or more embodiments provides a sound collecting method including: generating a voice signal by a microphone based on air vibration; generating a vibration signal by a vibration sensor based on vibration transmitted to a human body through speech; generating a converted voice signal by an adaptive filter, with the voice signal as a target signal, by multiplying the vibration signal by a coefficient to bring the vibration signal closer to the target signal; generating a residual signal, which is a difference between the target signal and the converted voice signal, by a subtractor, and controlling the adaptive filter by an adaptive controller to update a coefficient to be multiplied by the vibration signal so that the residual signal becomes small, wherein the adaptive controller generates and supplies to the adaptive filter an adaptive filter control signal that controls the adaptive filter to update the coefficient so that when it is determined to be a voice section where voice is present, the residual signal becomes small at the first speed; and generates and supplies to the adaptive filter an adaptive filter control signal that controls the adaptive filter to update the coefficient so that when it is determined to be a non-voice section where the voice is not present, the residual signal becomes small at a second speed slower than the first speed, or not to update the coefficient.

A third aspect of one or more embodiments provides a sound collecting program product stored in a non-transitory storage medium causing a computer to execute the steps of: a step of generating a voice signal by a microphone based on air vibration; a step of generating a vibration signal by a vibration sensor based on vibration transmitted to a human body by speech; a step of setting the voice signal as a target signal and generating a converted voice signal by an adaptive filter, by multiplying the vibration signal by a coefficient to bring the vibration signal closer to the target signal; and a step of generating a residual signal, which is a difference between the target signal and the converted voice signal, by a subtractor, a step of controlling the adaptive filter by an adaptive controller to update a coefficient to be multiplied by the vibration signal so that the residual signal becomes small, wherein the step of controlling the adaptive filter by the adaptive controller to update the coefficient includes: a step of generating and suppling to the adaptive filter an adaptive filter control signal that controls the adaptive filter to update the coefficient when it is determined to be a voice section where voice is present so that the residual signal becomes small at the first speed; and a step of generating and supplying to the adaptive filter an adaptive filter control signal that controls the adaptive filter to update the coefficient when it is determined to be a non-voice section where the voice is not present so that the residual signal becomes small at a second speed slower than the first speed, or not to update the coefficient.

BRIEF DESCRIPTION OF THE DRAWINGS

FIG. 5 is a diagram illustrating a pattern for generating an adaptive filter control signal based on the detection signals by voice section detection units 51 and 52 in FIG. 4 and an environmental noise level generated by a sound pressure level ratio calculation unit 55.

FIG. 6 is a diagram illustrating a pattern for generating an adaptive filter control signal based on the detection signals by the voice section detection units 51 and 52 in FIG. 4 and a correlation degree calculated by a correlation degree calculation unit 56.

DETAILED DESCRIPTION

First Embodiment

Figure 1:
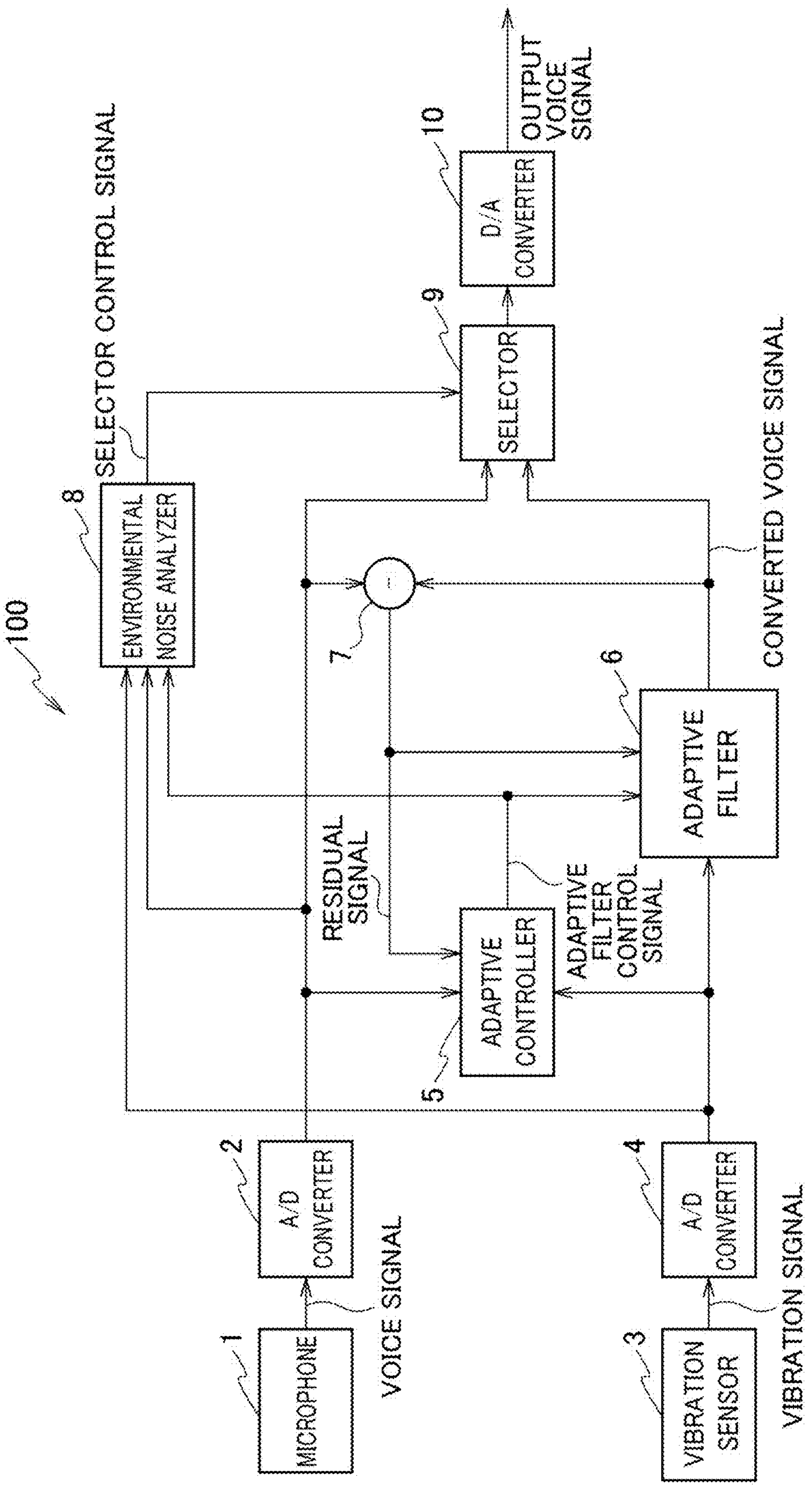
FIG. 1 is a block diagram illustrating a sound collecting device according to a first embodiment.

Hereinafter, a sound collecting device, a sound collecting method, and a sound collecting program according to a first embodiment will be described with reference to the accompanying drawings. FIG. 1 shows a sound collecting device 100 according to a first embodiment. In FIG. 1, a microphone 1 generates a voice signal (first voice signal) based on air vibration. Since the voice signal output from the microphone 1 is close to the voice that a person perceives through an ear, it is a target value when the vibration signal is converted into a voice signal as described later. The A/D converter 2 perform an A/D conversion of an analog voice signal supplied from the microphone 1 and supplies a digital voice signal to an adaptive controller 5, a subtractor 7, an environmental noise analyzer 8, and a selector 9.

A vibration sensor 3 generates a vibration signal based on the vibration transmitted to the human body. The vibration sensor 3 is arranged to contact the surface of the human body. The vibration sensor includes a vibration receiver embedded in the human body, a microphone arranged in direct contact with the human body, a camera for acquiring the vibration transmitted to the surface of the human body as an image, and a rangefinder for acquiring the vibration transmitted to the surface of the human body as position information. The A/D converter 4 performs an A/D conversion of the analog vibration signal supplied from the vibration sensor 3, and supplies a digital vibration signal to the adaptive controller 5, the adaptive filter 6, and the environmental noise analyzer 8.

Figure 2A:
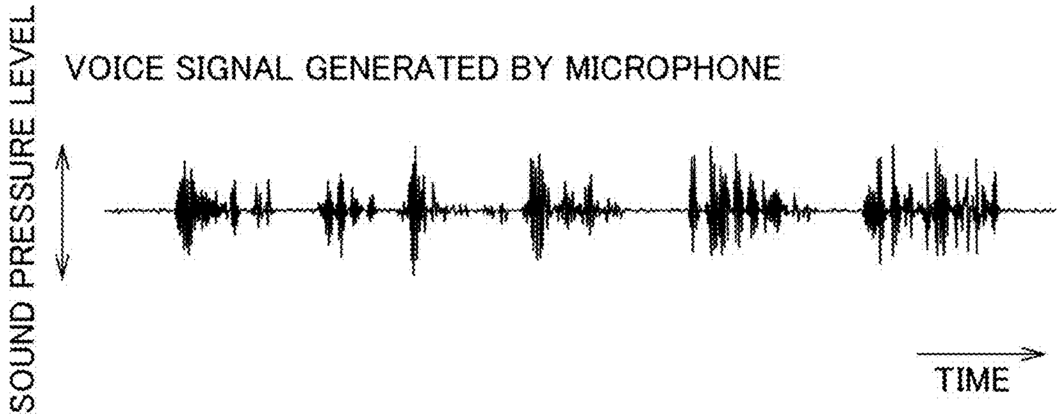
FIG. 2A is a waveform diagram illustrating a voice signal generated by a microphone.
Figure 2B:
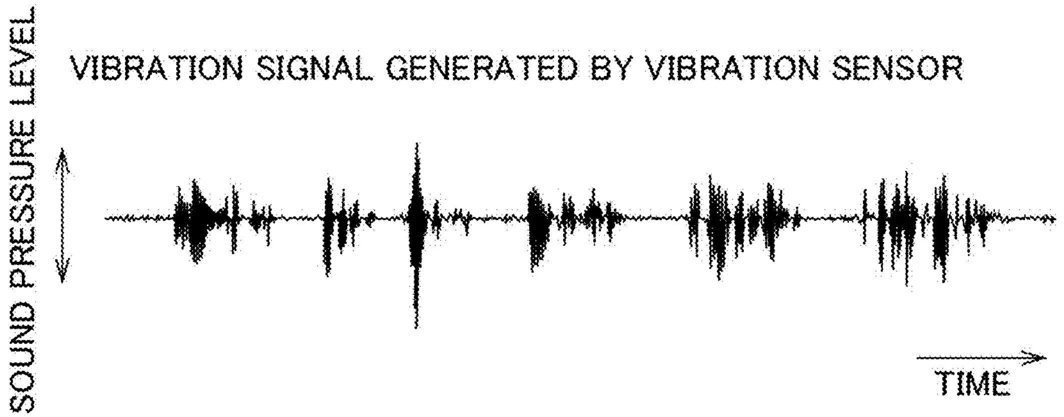
FIG. 2B is a waveform diagram illustrating a vibration signal generated by a vibration sensor.
Figure 3:
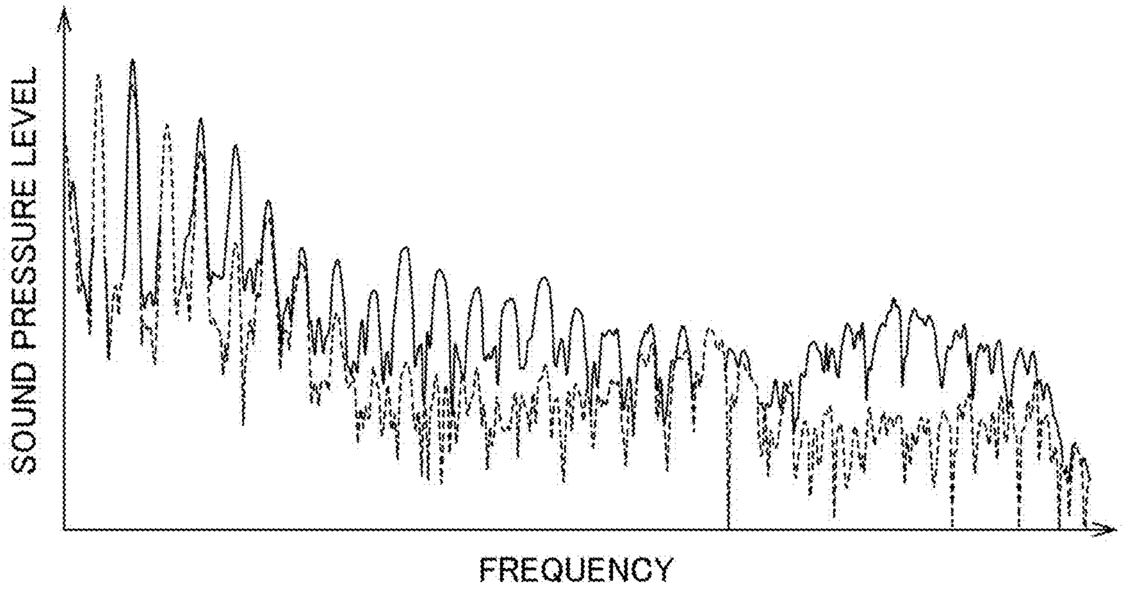
FIG. 3 is a characteristic diagram illustrating frequency characteristics of a voice signal and a vibration signal.

FIG. 2A shows a voice signal generated by the microphone 1, and FIG. 2B shows a vibration signal generated by the vibration sensor 3 during the same period as the voice signal in FIG. 2A. As can be seen by comparing FIG. 2A with FIG. 2B, the voice signal and the vibration signal have different sound pressure levels. FIG. 3 shows the frequency characteristics of the voice signal and the vibration signal. In some frequency bands, the sound pressure level of the vibration signal indicated by the dashed line is smaller than that of the voice signal indicated by the solid line. When the vibration signal is supplied to the speaker and output as voice, voice is muffled and sounds different from the original voice compared to the case where the voice signal produced by the microphone 1 is supplied to a speaker and output as voice.

Returning to FIG. 1, the adaptive controller 5 generates an adaptive filter control signal for controlling the adaptive filter 6 based on the voice signal output from the A/D converter 2, the vibration signal output from the A/D converter 4, and the residual signal output from the subtractor 7, and supplies it to the adaptive filter 6 and the environmental noise analyzer 8. As will be described below, the adaptive filter 6 generates a converted voice signal by correcting the vibration signal to be closer to the voice signal generated by the microphone 1, and supplies it to the subtractor 7 and the selector 9.

The subtractor 7 supplies the difference between the converted voice signal output from the adaptive filter 6 and the voice signal output from the A/D converter 2 as a residual signal to the adaptive controller 5 and the adaptive filter 6.

Figure 4:
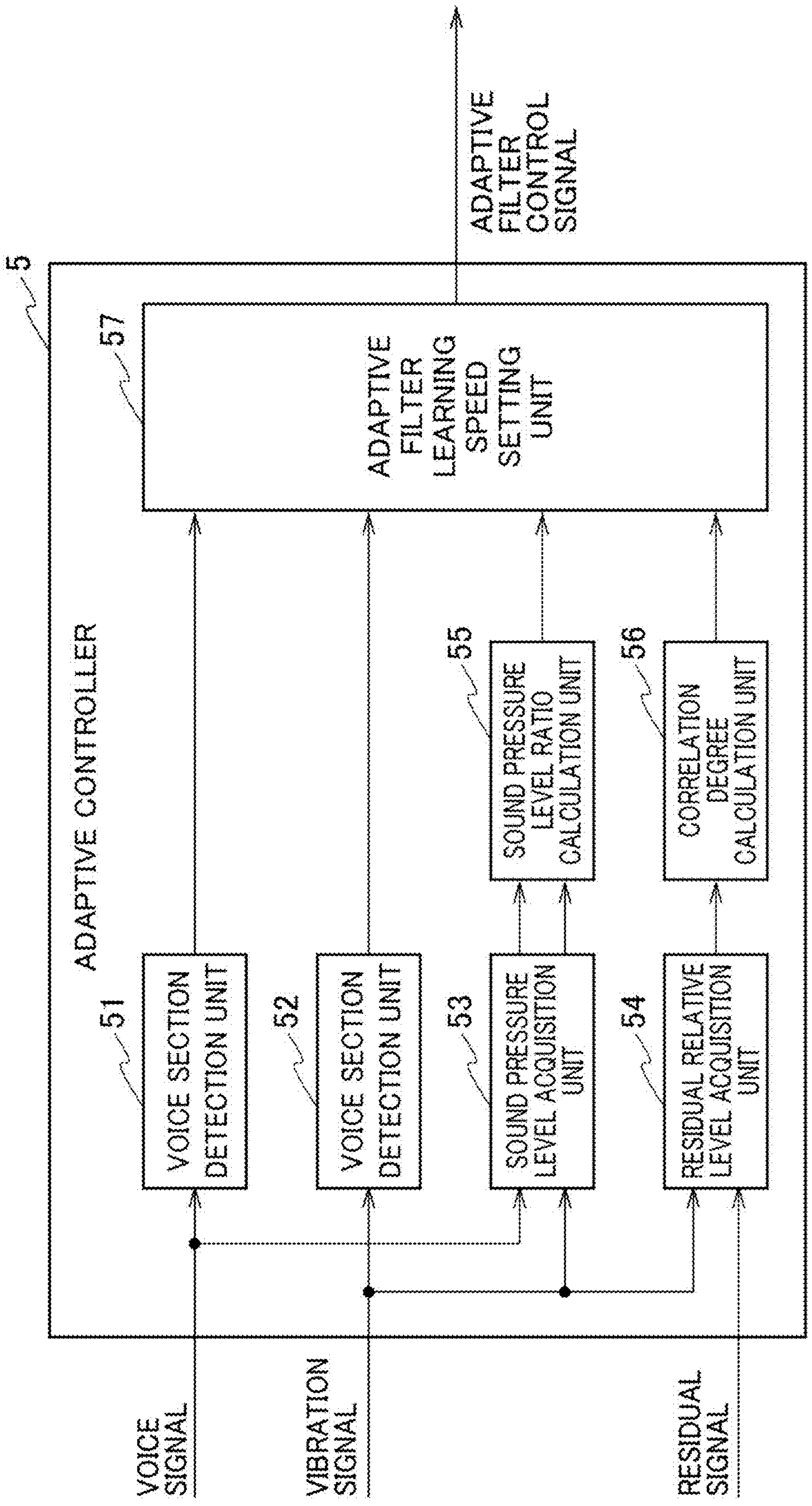
FIG. 4 is a block diagram illustrating a specific configuration example of an adaptive controller 5 in FIG. 1.

FIG. 4 shows a specific configuration example of the adaptive controller 5. Schematically, the adaptive controller 5 generates an adaptive filter control signal to vary the operation of the adaptive filter 6 depending on whether it is a voice section where voice such as speech is present or a non-voice section where voice is not present.

The adaptive controller 5 includes voice section detection units 51 and 52, a sound pressure level acquisition unit 53, a sound pressure level ratio calculation unit 55, a residual relative level acquisition unit 54, a correlation degree calculation unit 56, and an adaptive filter learning speed setting unit 57. The voice section detection units 51 and 52 detect voice sections of a voice signal and a vibration signal, respectively, by a technique called Voice Activity Detection (VAD). The voice section detection units 51 and 52 detect voice sections according to whether at least the sound pressure level exceeds a predetermined level.

In order to improve the detection accuracy of voice sections, the voice section detection units 51 and 52 may detect voice sections by adopting the technology described in Japanese Patent No. 5874344 (Patent Literature 3) or Japanese U.S. Pat. No. 5,948,918 (Patent Literature 4) and detecting features of a human voice by analyzing frequencies. Each of the voice section detection units 51 and 52 supplies a detection signal for discriminating a voice section and a non-voice section of a voice signal and a vibration signal to the adaptive filter learning speed setting unit 57.

A sound pressure level acquisition unit 53 acquires sound pressure levels of a voice signal and a vibration signal. A sound pressure level ratio calculation unit 55 calculates a sound pressure level ratio which is a ratio between a sound pressure level of a voice signal and a sound pressure level of a vibration signal, and supplies it to an adaptive filter learning speed setting unit 57. The sound pressure levels of the voice signal and the vibration signal may be expressed as an average amplitude value of the sound pressure per unit time, or may be expressed as a sum of squares of the sound pressure per unit time. The ratio of the sound pressure level in the speaking section and the ratio of the sound pressure level in the non-speaking section differ depending on the environmental noise level. Therefore, the sound pressure level ratio calculated by the sound pressure level ratio calculation unit 55 indicates the environmental noise level.

The residual signal output from the subtractor 7 and the vibration signal output from the A/D converter 4 are input to the residual relative level acquisition unit 54. In the voice section, air vibration due to speech or the like is input to the microphone 1 and vibration due to speech or the like is transmitted to the vibration sensor 3, so that the residual signal is at a low level. In the non-voice section or when there is environmental noise in the voice section, the residual signal is at a relatively high level. A residual relative level acquisition unit 54 normalizes the level of the residual signal output from the subtractor 7 by the level of the vibration signal to acquire the residual relative level.

The larger the vibration signal, the larger the level of the residual signal tends to be. Therefore, by normalizing the level of the residual signal by the level of the vibration signal, the residual relative level, which is the level of the residual signal that is not affected by the magnitude of the vibration signal, can be obtained.

The correlation degree calculation unit 56 compares the residual relative level with a predetermined threshold (second threshold) to calculate the correlation degree. The correlation degree calculation unit 56 determines that the correlation between the voice signal and the vibration signal is high when the residual relative level is below the threshold, and outputs a correlation degree having a value indicating that the correlation is high. The correlation degree calculation unit 56 determines that the correlation between the voice signal and the vibration signal is low when the residual relative level exceeds the threshold, and outputs a correlation degree having a value indicating that the correlation is low.

The adaptive filter learning speed setting unit 57 discriminates the voice section and the non-voice section at least based on the detected signals by the voice section detecting sections 51 and 52, and generates an adaptive filter control signal.

For better operation of the adaptive filter 6, the adaptive filter learning speed setting unit 57 may generate an adaptive filter control signal based on the detection signals by the voice section detection units 51 and 52 and the environmental noise level generated by the sound pressure level ratio calculation unit 55. For better operation of the adaptive filter 6, the adaptive filter learning speed setting unit 57 may generate an adaptive filter control signal based on the detection signals by the voice section detection units 51 and 52 and the determination result by the correlation degree calculation unit 56.

FIG. 5 shows patterns #1 to #4 when an adaptive filter control signal is generated based on the detection signals by the voice section detection units 51 and 52 and the environmental noise level generated by the sound pressure level ratio calculation unit 55. The voice section detection in FIG. 5 shows the result of determining whether to be a voice section (on) or not a voice section (off) by considering the detection signal by the voice section detection unit 51 and the detection signal by the voice section detection unit 52 together.

The adaptive filter learning speed setting unit 57 may determine to be a voice section (on) if either one of the detection signals by the voice section detection unit 51 and the detection signal by the voice section detection unit 52 indicates a voice section. Conversely, the adaptive filter learning speed setting unit 57 may determine not to be a voice section (off) if either one indicates a non-voice section.

As shown in FIG. 5, in pattern #1, the adaptive filter learning speed setting unit 57 sets the learning speed as saving when the voice section detection is off and the environmental noise level is low, that is less than or equal to a predetermined threshold (first threshold). In pattern #2, the adaptive filter learning speed setting unit 57 sets the learning speed as active when the voice section detection is on and the environmental noise level is low.

In pattern #3, the adaptive filter learning speed setting unit 57 sets the learning speed as saving when the voice section detection is off and the environmental noise level is high exceeding a predetermined threshold. In pattern #4, the adaptive filter learning speed setting unit 57 sets the learning speed as saving when the voice section detection is on and the environmental noise level is high. “The learning speed is active” means that the adaptive operation in the adaptive filter 6 is actively promoted, and “the learning speed is saving” means that the adaptive operation in the adaptive filter 6 is suppressed or stopped.

Specifically, actively promoting the adaptive operation in the adaptive filter 6 means that controlling the adaptive filter 6 to update the coefficient (described below) which multiplies the vibration signal within a short time at the first speed. Suppressing the adaptive operation in the adaptive filter 6 means controlling the adaptive filter 6 to update the coefficient over a long time at the second speed slower than the first speed. Stopping the adaptive operation in the adaptive filter 6 means controlling the adaptive filter 6 not to update the coefficient (to maintain the coefficient).

FIG. 6 shows patterns #5 to #8 for generating an adaptive filter control signal based on the detection signals by the voice section detection units 51 and 52 and the correlation degree calculated by the correlation degree calculation unit 56. The voice section detection in FIG. 6 is the same as the voice section detection in FIG. 5.

As shown in FIG. 6, in the pattern #5, the adaptive filter learning speed setting unit 57 sets the learning speed as saving when the voice section detection is off and the correlation degree is high. In pattern #6, the adaptive filter learning speed setting unit 57 sets the learning speed as active when the voice section detection is on and the correlation degree is high.

In pattern #7, the adaptive filter learning speed setting unit 57 sets the learning speed as saving when the voice section detection is off and the correlation degree is low. In pattern #8, the adaptive filter learning speed setting unit 57 sets the learning speed as saving when the voice section detection is on and the correlation degree is low.

As shown in FIG. 5, it is preferable that the adaptive filter learning speed setting unit 57 generates an adaptive filter control signal that sets the learning speed in the adaptive filter 6 as active when a first condition that it is a voice section and the environmental noise level is low (below the first threshold) is satisfied. It is preferable that the adaptive filter learning speed setting unit 57 generates an adaptive filter control signal that sets the learning speed in the adaptive filter 6 as saving when the first condition is not satisfied.

As shown in FIG. 6, it is preferable that the adaptive filter learning speed setting unit 57 generates an adaptive filter control signal that sets the learning speed in the adaptive filter 6 as active when the second condition that a voice section is present and a correlation degree is high (the residual relative level is less than or equal to the second threshold) is satisfied. It is preferable that the adaptive filter learning speed setting unit 57 generates an adaptive filter control signal that sets the learning speed in the adaptive filter 6 as saving when the second condition is not satisfied.

If the learning speed is set as activate, the adaptive filter 6 updates the coefficient at the first speed. If the learning speed is set as saving, the adaptive filter 6 updates the coefficient at the second speed slower than the first speed or does not update the coefficient.

The adaptive filter learning speed setting unit 57 may generate an adaptive filter control signal based on the voice section detection, the environmental noise level, and the correlation degree. In this case, either of the environmental noise level and the correlation degree may be given priority to set as active or saving. Moreover, the environmental noise level and the correlation degree may be made into points, and the adaptive filter learning speed setting unit 57 may determine whether to be a voice section by combining the points of the environmental noise level and the points of the correlation degree, and set as active or saving.

Figure 7:
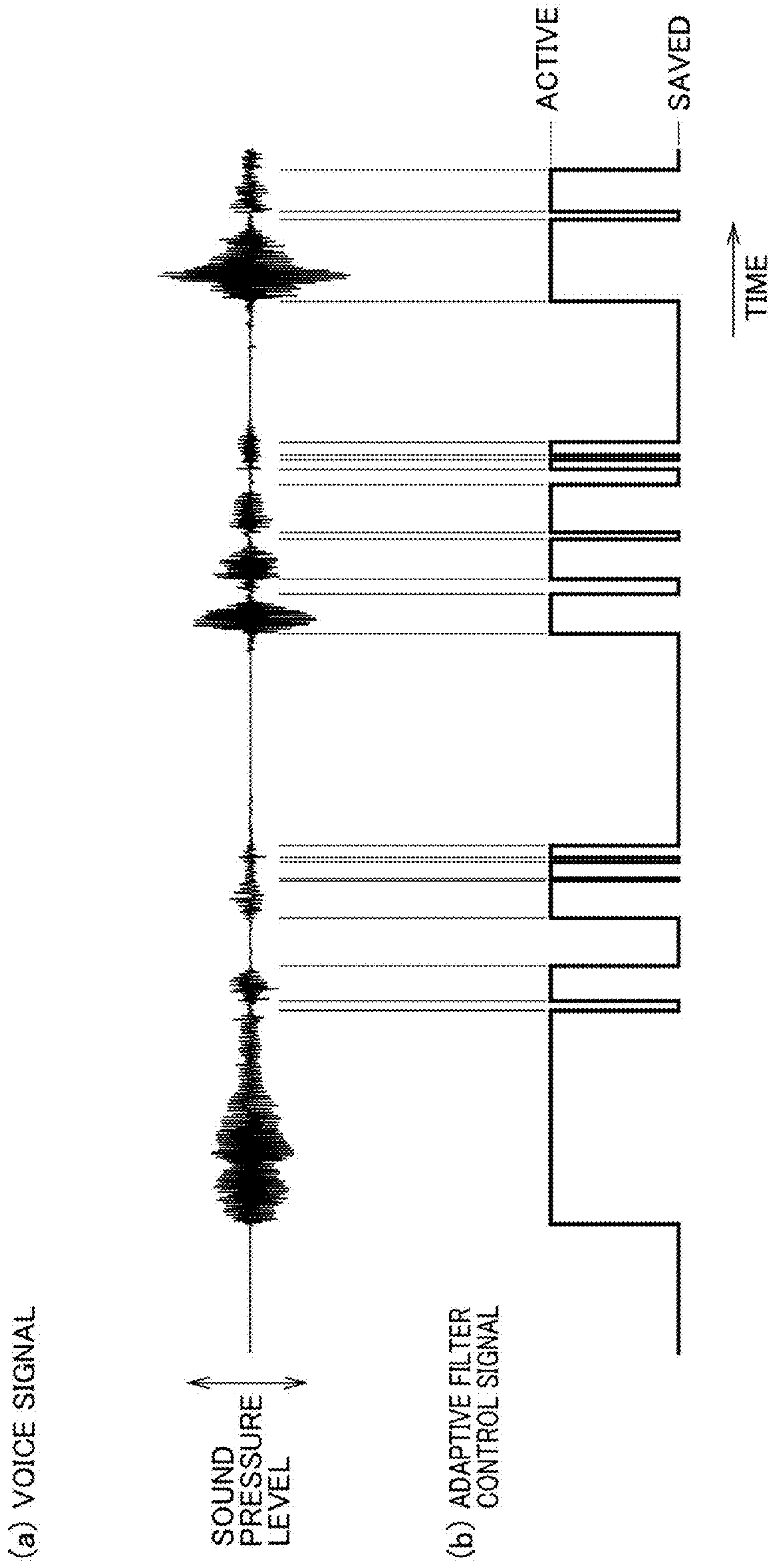
FIG. 7 is a waveform diagram illustrating the relationship between the voice signal and the adaptive filter control signal.

FIG. 7 shows the relationship between the voice signal shown in (a) and the adaptive filter control signal shown in (b). The adaptive filter control signal is high in the voice section and low in the non-voice section of the voice signal. “High” in the adaptive filter control signal indicates “active”, and “low” in the adaptive filter control signal indicates “saving”. Here, it is assumed that the environmental noise level in the voice section is low, and the degree of correlation between the voice signal and the vibration signal is high.

Figure 8:
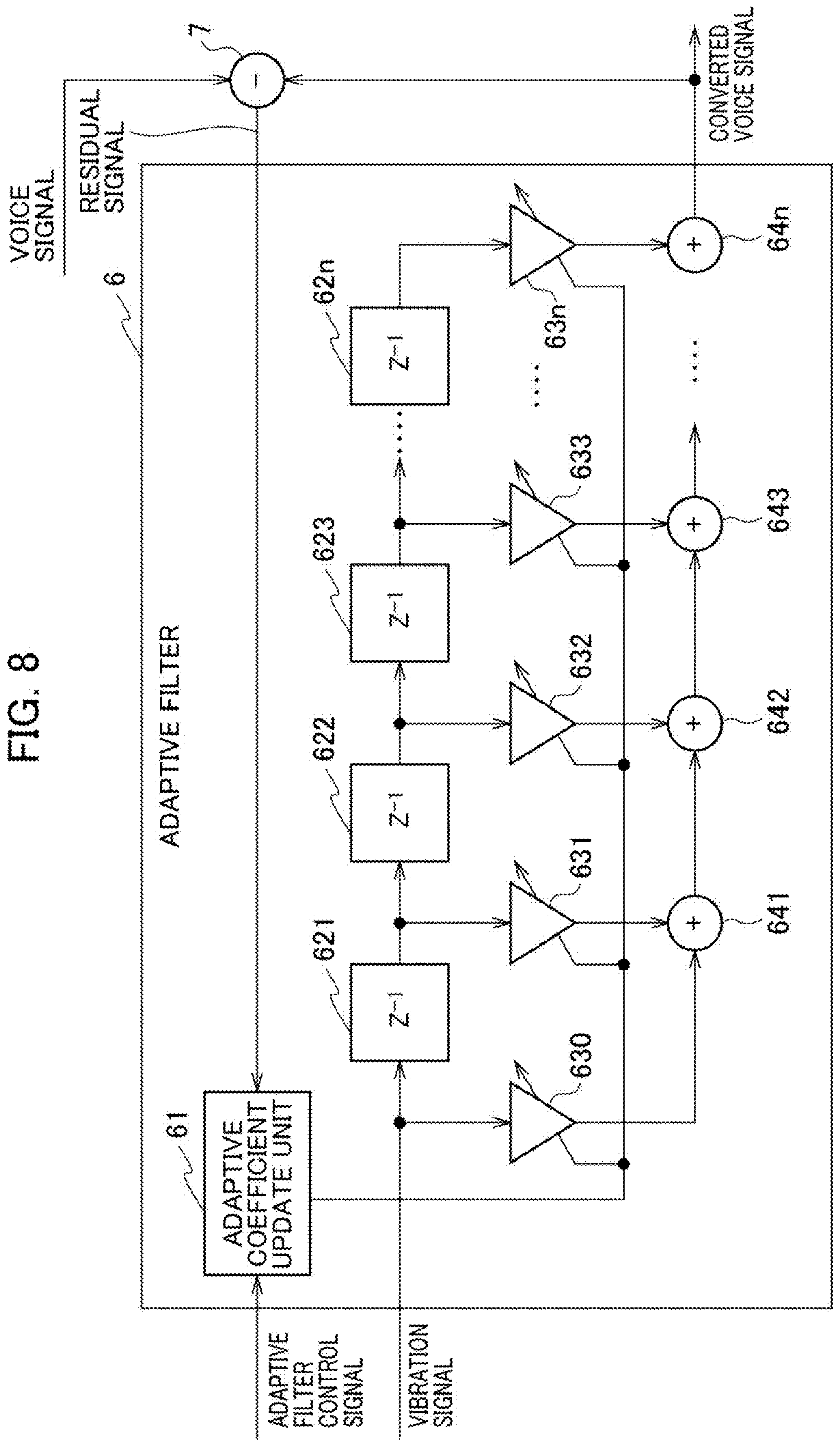
FIG. 8 is a block diagram illustrating a specific configuration example of the adaptive filter 6 in FIG. 1.

FIG. 8 shows a specific configuration example of the adaptive filter 6 using the FIR filter. The adaptive filter 6 includes an adaptive coefficient update unit 61, a delay unit 621 to **62*n*, a multiplier 630 to 63*n*, and an adder 641 to 64*n*. n is a number of tens to hundreds. The delay unit 621 to 62*n* delays and outputs each sample of the input digital vibration signal by one clock. The multiplier 630 to 63*n* multiplies each sample input to the delay unit 621 and each sample output from the delay unit 621 to 62*n*** by a coefficient and outputs them.

The adder 641 to **64*n* adds the outputs of the multipliers 630 and 631, the outputs of the adder 641 and the multiplier 632, the outputs of the adder 642 and the multiplier 633, . . . and the outputs of the adder 64 (n−1) (not shown) and the multiplier 63*n*, respectively. Thus, the adder 64*n* outputs a converted voice signal obtained by correcting the vibration signal output from the A/D converter 4 to be closer to the voice signal output from the A/D converter 2**.

The subtractor 7 outputs a residual signal which is a difference between the converted voice signal output from the adder **64*n* and the voice signal output from the A/D converter 2. The adaptive coefficient update unit 61 updates the coefficient that multiplier 630-63*n*** multiply to the inputted samples so that the residual signal becomes small.

At this time, when the adaptive filter control signal is high, indicating “active”, the adaptive coefficient update unit 61 updates the coefficient to be supplied to the multiplier 630 to **63*n* in a short time so that the residual signal becomes small. When the adaptive filter control signal is low, indicating “saving”, the adaptive coefficient update unit 61 updates the coefficient to be supplied to the multiplier 630 to 63*n*** in a direction where the residual signal becomes small over a long time, or does not update the coefficient.

As explained with reference to FIG. 5, even though the voice section detection units 51 and 52 detect a voice section, the adaptive controller 5 sets the adaptive filter control signal as low so that the learning speed of the adaptive filter 6 is set as saving if the environmental noise level is high. If the coefficient supplied to the multiplier 630 to **63*n*** is updated when the environmental noise level is high, the vibration signal may be approximated to the environmental noise, to reduce the sound quality of the converted voice signal.

As explained with reference to FIG. 6, even though the voice section detection units 51 and 52 detects a voice section, the adaptive controller 5 sets the adaptive filter control signal as low when the correlation degree is low. Similarly, if the coefficient supplied to the multiplier 630 to **63*n*** is updated when the correlation degree is low, the sound quality of the converted voice signal may be reduced.

Therefore, if the adaptive filter control signal is low, the adaptive coefficient update unit 61 may not update the coefficient, or if it does, it may not update it immediately, but gradually update the coefficient over a long time. The adaptive filter 6 obtains a coefficient that brings the vibration signal closer to the voice signal by learning before the environmental noise level becomes high or the correlation degree becomes low, and outputs a converted voice signal having good voice quality. Therefore, the adaptive filter 6 can continuously output a converted voice signal having good voice quality without updating the coefficient only for a short time when the environmental noise level becomes high or the correlation degree becomes low.

Figure 9:
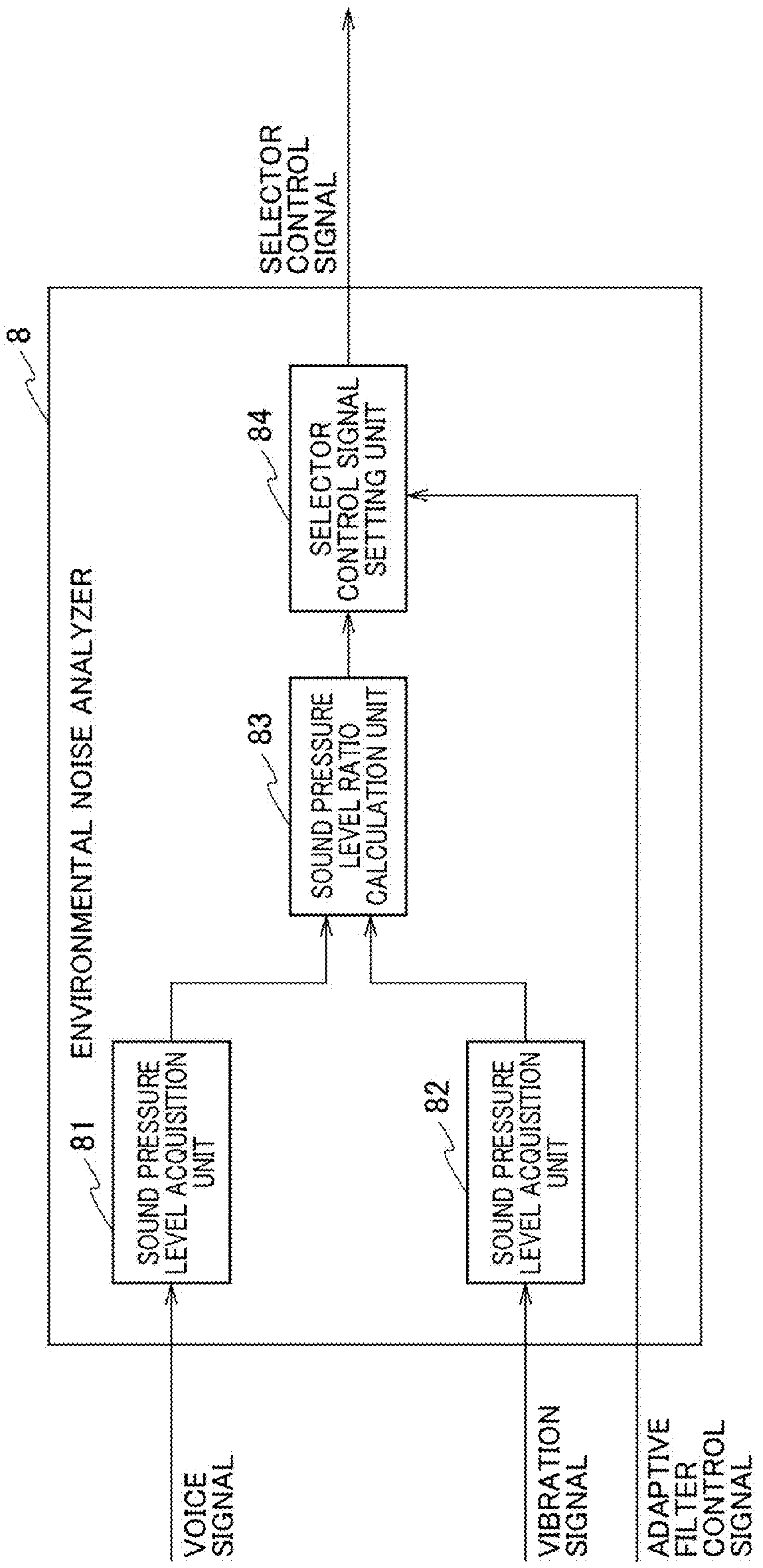
FIG. 9 is a block diagram illustrating a specific configuration example of an environmental noise analyzer 8 in FIG. 1.

FIG. 9 shows a specific configuration example of the environmental noise analyzer 8. The environmental noise analyzer 8 includes sound pressure level acquisition units 81 and 82, a sound pressure level ratio calculation unit 83, and a selector control signal setting unit 84. The sound pressure level acquisition unit 81 acquires the sound pressure level of the voice signal output from the A/D converter 2. The sound pressure level acquisition unit 82 acquires the sound pressure level of the vibration signal output from the A/D converter 4. The sound pressure level ratio calculation unit 83 calculates the sound pressure level ratio, which is the ratio between the sound pressure level of the voice signal and the sound pressure level of the vibration signal. The sound pressure level ratio calculated by the sound pressure level ratio calculation unit 83 indicates the environmental noise level.

The sound pressure level acquisition units 81 and 82 and the sound pressure level ratio calculation unit 83 have substantially the same configuration as the sound pressure level acquisition unit 53 and the sound pressure level ratio calculation unit 55 in the adaptive controller 5 shown in FIG. 4. Therefore, the sound pressure level acquisition unit 53 and the sound pressure level ratio calculation unit 55 in the adaptive controller 5 can be used as a part of the environmental noise analyzer 8.

The environmental noise analyzer 8 is provided to select the voice signal output from the A/D converter 2 by the selector 9 when the environmental noise does not affect the voice such as speech in the voice section, and to select the converted voice signal output from the adaptive filter 6 by the selector 9 when the environmental noise does affect the voice.

The sound pressure level ratio output from the sound pressure level ratio calculation unit 83 and the adaptive filter control signal supplied from the adaptive controller 5 are input to the selector control signal setting unit 84. The adaptive filter control signal is input to the selector control signal setting unit 84 in order to generate a selector control signal for selecting the voice signal output from the A/D converter 2 and the converted voice signal output from the adaptive filter 6 based on the environmental noise level in the non-voice section. Since the environmental noise level in the voice section is affected by the voice, it may not indicate the true environmental noise level.

The selector control signal setting unit 84 selects the voice signal when the environmental noise level in the non-voice section is less than or equal to a predetermined threshold (third threshold), generates a selector control signal for selecting the converted voice signal when the environmental noise level in the non-voice section exceeds the threshold, and supplies it to the selector 9. The third threshold used by the selector control signal setting unit 84 may be the same as or different from the first threshold used by the adaptive filter learning speed setting unit 57.

Figure 10:
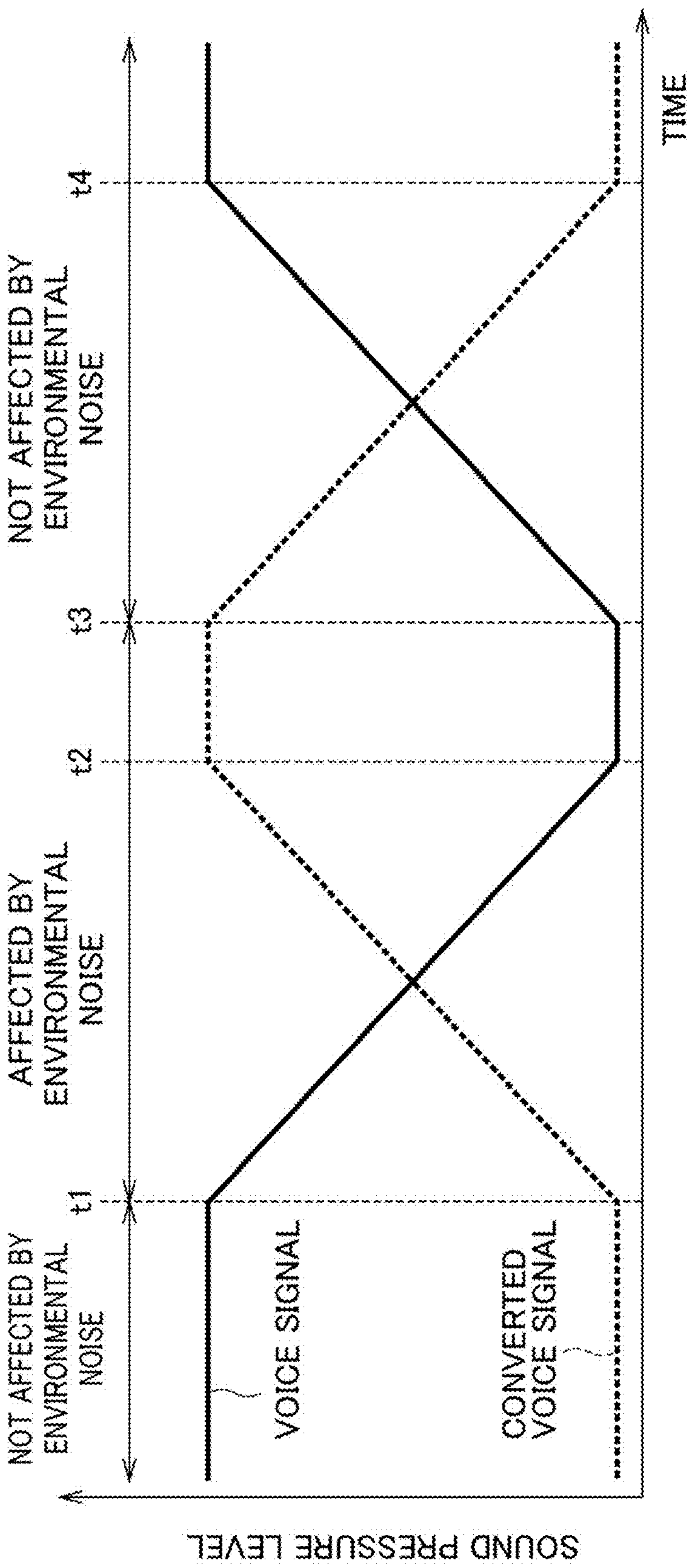
FIG. 10 is a diagram illustrating an example of an operation in which a selector 9 in FIG. 1 selects a voice signal and a converted voice signal.

FIG. 10 shows an example of an operation in which the selector 9 selects a voice signal and a converted voice signal. In FIG. 10, the environmental noise level is less than or equal to a threshold before time t1, and the environmental noise does not affect the voice in the voice section. At times t1 to t3, the environmental noise level exceeds the threshold, and the environmental noise affects the voice in the voice section. After time t3, the environmental noise returns to a state that does not affect the voice in the voice section.

In this case, the environmental noise analyzer 8 supplies a selector control signal for selecting the voice signal to the selector 9 before time t1, and the selector 9 selects and outputs the voice signal. After time t1, the environmental noise analyzer 8 supplies a selector control signal for selecting the converted voice signal to the selector 9. Instead of immediately switching the voice signal to the converted voice signal, the selector 9 switches the voice signal to the converted voice signal at time t2 while gradually decreasing the sound pressure level of the voice signal and gradually increasing the sound pressure level of the converted voice signal over the time from t1 to t2.

After the time t3, the environmental noise analyzer 8 supplies a selector control signal for selecting a voice signal to the selector 9. Similarly, the selector 9 switches to the voice signal at the time t4 while gradually decreasing the sound pressure level of the converted voice signal and gradually increasing the sound pressure level of the voice signal over the time t3 to t4.

When switching between the voice signal and the converted voice signal, the selector 9 mixes the voice signal and the converted voice signal while gradually decreasing the sound pressure level of one and gradually increasing the sound pressure level of the other, so that the voice signal and the converted voice signal can be switched without discomfort.

Instead of switching between the voice signal and the converted voice signal as shown in FIG. 10, the selector 9 may adaptively mix the voice signal and the converted voice signal. In this case, the selector 9 may mix the voice signal and the converted voice signal in accordance with the correlation degree calculated by the correlation degree calculation unit 56. The selector 9 mixes the voice signal and the converted voice signal by increasing the weighting of the voice signal when the correlation degree is high, and the selector 9 mixes the voice signal and the converted voice signal by increasing the weighting of the converted voice signal when the correlation degree is low.

The environmental noise analyzer 8 may be omitted when the selector 9 mixes the voice signal and the converted voice signal in accordance with the correlation degree calculated by the correlation degree calculation unit 56. The correlation degree calculation unit 56 may calculate a correlation of three or more levels, and the selector 9 may mix the voice signal and the converted voice signal by varying the weights of the two in a plurality of ways. The correlation degree may be calculated by the correlation degree calculation unit 56 in two stages, or any number of stages.

Referring to FIG. 1, the D/A converter 10 performs a D/A conversion of the voice signal supplied from the selector 9, the mixed voice signal between the voice signal and the converted voice signal, or the converted voice signal to generate an analog output voice signal. The output voice signal generated by the sound collecting device 100 as described above is supplied to an optional device such as an external speaker, a headphone, or a voice recording device.

As described above, the sound collecting device 100 does not always update the coefficient to be multiplied by the converted voice signal in the adaptive filter 6 so that the residual signal becomes small in a short time, but updates it over a long time or does not update it when the quality of the converted voice signal may be deteriorated. Therefore, the sound collecting device 100 can improve the quality of the voice signal (converted voice signal) based on the vibration signal generated by the vibration sensor 3 compared with the sound collecting device described in Patent Literature 1.

Furthermore, the sound collecting device 100 selects and outputs the voice signal output from the A/D converter 2 by the selector 9 and the converted voice signal output from the adaptive filter 6. Therefore, with the sound collecting device 100, the voice signal generated by the microphone 1 and the voice signal based on the vibration signal generated by the vibration sensor 3 can be selected as appropriate depending on the environment.

Second Embodiment

Figure 11:
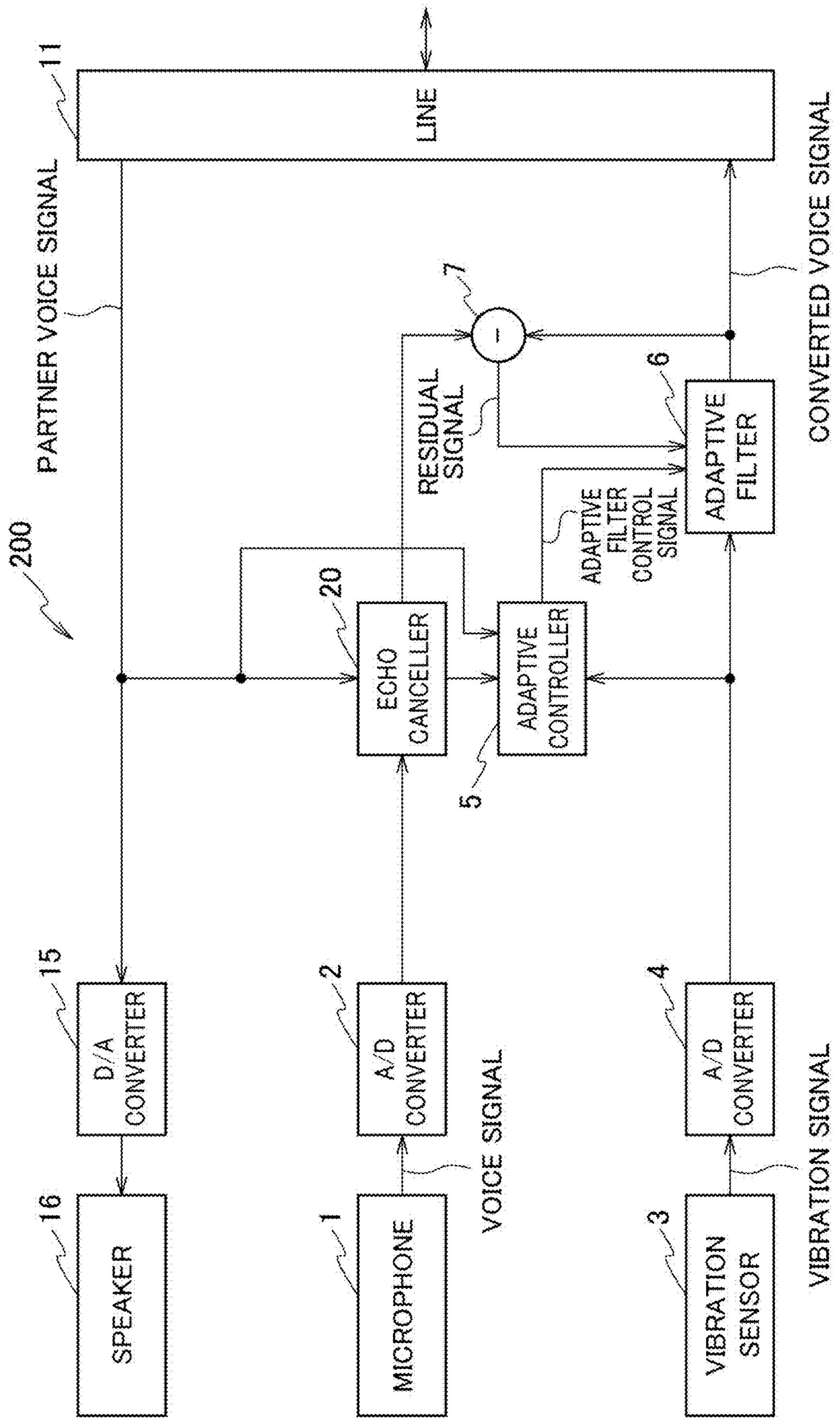
FIG. 11 is a block diagram illustrating a sound collecting device according to a second embodiment.

Hereinafter, the sound collecting device, the sound collecting method, and the sound collecting program according to a second embodiment will be described with reference to the accompanying drawings. FIG. 11 shows the sound collecting device 200 according to a second embodiment. In the sound collecting device 200 according to a second embodiment, the same parts as the sound collecting device 100 according to a first embodiment are denoted by the same signs, and the description thereof may be omitted.

In FIG. 11, the microphone 1 generates a voice signal (first voice signal) based on air vibration. The A/D converter 2 performs an A/D conversion of the analog voice signal supplied from the microphone 1 and supplies the digital voice signal to the echo canceller 20. Although the first voice signal is similar to voice perceived by a person through the ear, the first voice signal may include an echo component. Therefore, it is desirable to set the voice signal output from the echo canceller 20 as a target signal when converting a vibration signal, which will be described below, into a voice signal.

The digital voice signal (second voice signal), which is the voice (the partner voice) transmitted from the communication partner and received via a server and a line 11, is supplied to the echo canceller 20 and the D/A converter 15. The second voice signal may be referred to as the partner voice signal. The D/A converter 15 performs D/A conversion of the input digital voice signal and supplies the analog voice signal to the speaker 16. The speaker 16 reproduces the input voice signal and outputs the partner voice. At this time, since the microphone 1 collects the partner voice output from the speaker 16, the voice emitted by the communication partner may be superimposed on the voice emitted by the user as an echo component.

The echo canceller 20 suppresses the echo component superimposed on the voice signal output from the A/D converter 2 by using the voice signal received via the line 11. The echo canceller 20 supplies the voice signal whose echo component is suppressed to the adaptive controller 5 and the subtractor 7. Although the echo canceller 20 may not be able to completely cancel the echo component superimposed on the voice signal collected by the microphone 1, the voice signal output from the echo canceller 20 is called the echo-canceled voice signal.

Figure 12:
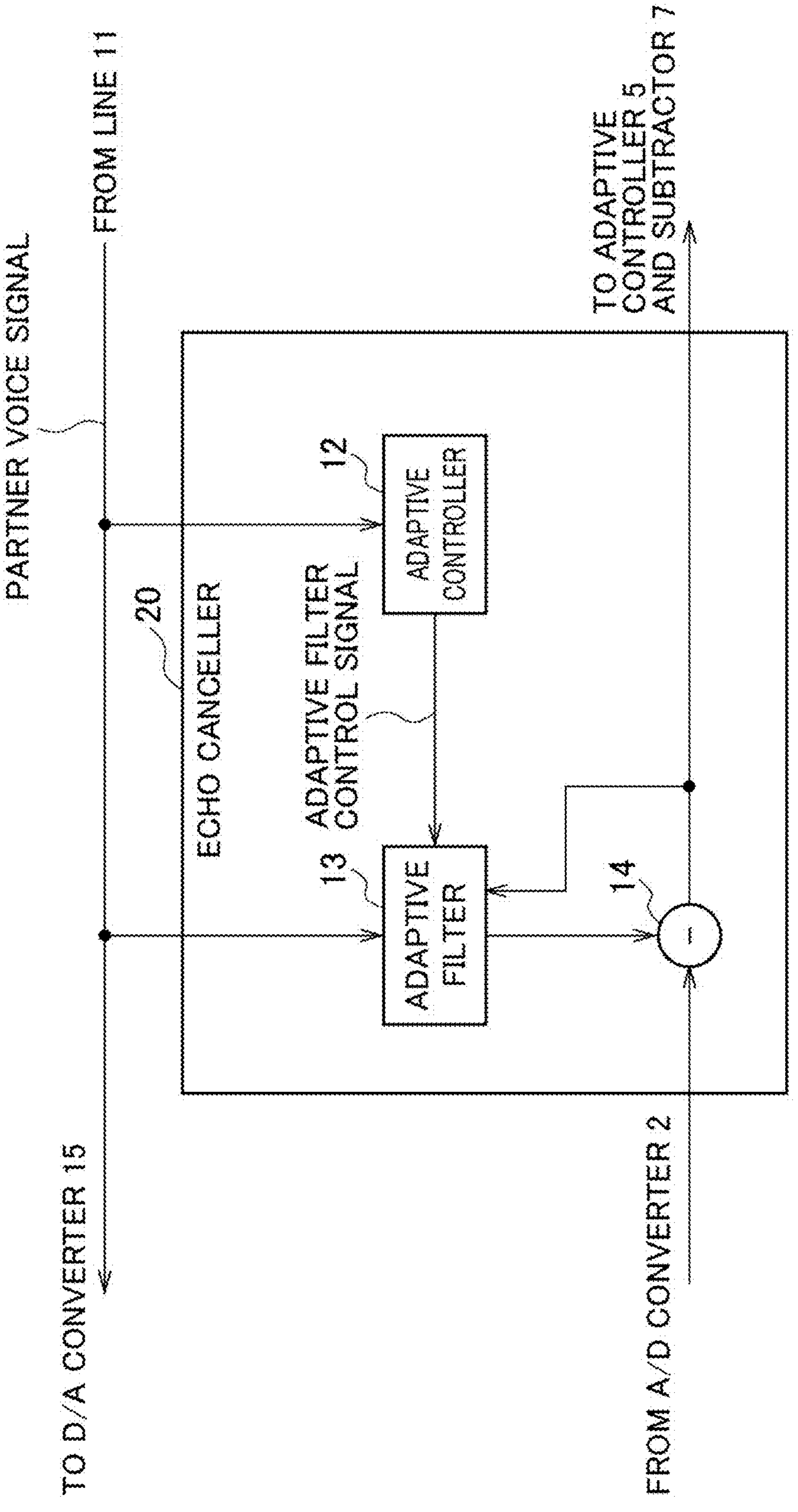
FIG. 12 is a block diagram illustrating a configuration example of an echo canceller provided in the sound collecting device according to a second embodiment.

As an example, the echo canceller 20 may have a configuration as shown in FIG. 12. As shown in FIG. 12, the echo canceller 20 includes an adaptive controller 12, an adaptive filter 13, and a subtractor 14. The adaptive controller 12 generates an adaptive filter control signal for controlling the adaptive filter 13 and supplies it to the adaptive filter 13. In accordance with the adaptive filter control signal, the adaptive filter 13 multiplies the partner voice signal by a coefficient, generates a cancel voice signal for canceling the echo component from the voice signal superimposed by the echo component, and supplies it to the subtractor 14. A specific configuration example of the adaptive filter 13 will be described below.

The echo canceller 20 is not limited to a configuration including the adaptive filter 13 as shown in FIG. 12, and other echo suppression methods may be used. The specific configurations of the echo canceller 20 are not limited.

Returning to FIG. 11, the vibration sensor 3 generates a vibration signal based on vibration transmitted to the human body (the body of the user of the sound collecting device 200). The vibration sensor 3 is arranged to contact the surface of the human body. The vibration sensor includes a vibration receiver embedded in the body, a microphone arranged in direct contact with the human body, a camera for acquiring the vibration transmitted to the surface of the human body as an image, and a rangefinder for acquiring the vibration transmitted to the surface of the human body as position information. The A/D converter 4 performs an A/D conversion of the analog vibration signal supplied from the vibration sensor 3, and supplies the digital vibration signal to the adaptive controller 5 and the adaptive filter 6.

As will be described below, the adaptive filter 6 sets the echo-canceled voice signal output from the echo canceller 20 as a target signal and generates a converted voice signal by correcting the vibration signal to be closer to the target signal, and supplies it to the line 11. The line 11 is the Internet line, for example. The converted voice signal is transmitted to a communication partner via the line 11 and an unillustrated Internet communication server.

Figure 13:
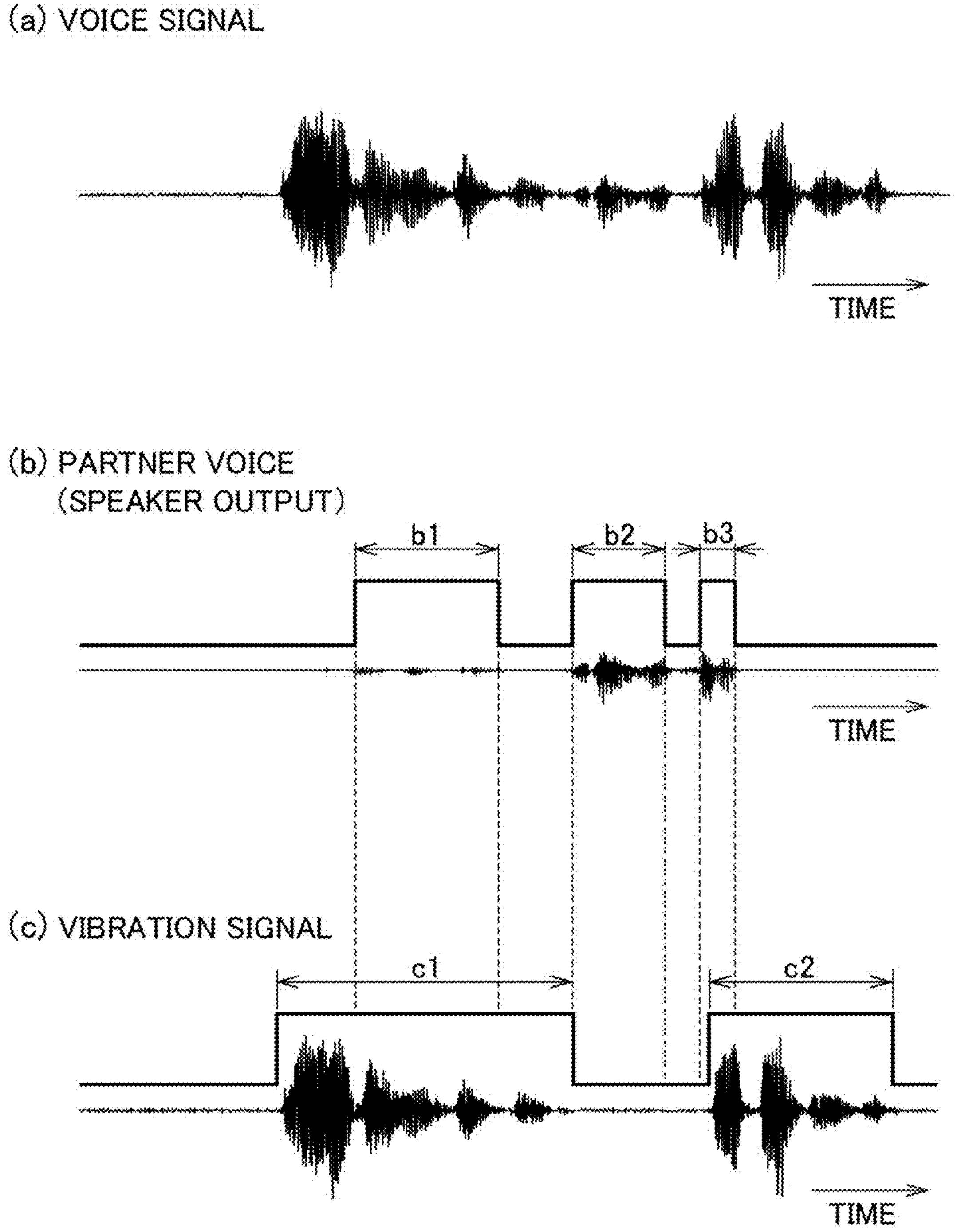
FIG. 13 is a waveform diagram illustrating an example of a voice signal generated by a microphone, a partner voice output from a speaker, and a vibration signal generated by a vibration sensor.

In FIG. 13, (a) shows a voice signal generated by the microphone 1, (a) shows a partner voice output from the speaker 16, and (c) shows a vibration signal generated by the vibration sensor 3. In (b) of FIG. 13, the sections b1, b2, and b3 are voice sections (speech sections) in which a voice is present caused by the speech of the communication partner, and the sections other than the sections b1, b2, and b3 are non-voice sections (non-speech sections) in which partner voice is not present. In (c) of FIG. 13, the sections c1 and c2 are voice sections in which a voice caused by the speech of the user is present, and the sections other than the sections c1 and c2 are non-voice sections in which voice of the user is not present.

Since most of the section b3 overlaps with the section c2 and the sound pressure level of both the partner voice and the user voice is high, the echo component is likely to remain even though the echo canceller cancels the echo. Although the section b1 overlaps with the section c1 and the sound pressure level of the partner voice is low, the echo component may remain. The section b2 is located in the non-voice section of the user voice, and it can be expected that the echo component is sufficiently cancelled by the echo canceller.

Figure 14:
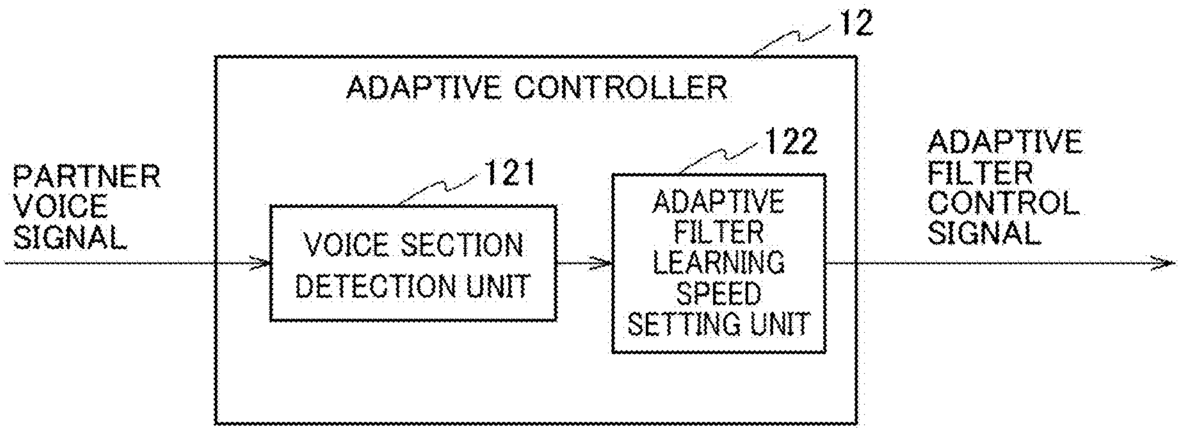
FIG. 14 is a block diagram illustrating a specific configuration example of an adaptive controller 12 in FIG. 12.

FIG. 14 shows a specific configuration example of the adaptive control section 12 shown in FIG. 12. The adaptive controller 12 includes a voice section detection unit 121 and an adaptive filter learning speed setting unit 122. The voice section detection unit 121 detects the voice section of the partner voice by a technique called VAD and supplies the partner voice section information to the adaptive filter learning speed setting unit 122. The voice section detection unit 121 detects the voice section according to whether at least the sound pressure level exceeds a predetermined level.

Schematically, the adaptive controller 12 generates an adaptive filter control signal to vary the operation of the adaptive filter 13 depending on whether it is a voice section where the partner voice is present or a non-voice section where the partner voice is not present. Specifically, when the partner voice section information indicates the voice section of the partner voice, the adaptive filter learning speed setting unit 122 generates an adaptive filter control signal for setting the learning speed as active and supplies it to the adaptive filter 13. When the partner voice section information indicates the non-voice section of the partner voice, the adaptive filter learning speed setting unit 122 generates an adaptive filter control signal for setting the learning speed as saving and supplies it to the adaptive filter 13.

“The learning speed is active” means that the adaptive operation in the adaptive filter 13 is actively promoted, and “the learning speed is saving” means that the adaptive operation in the adaptive filter 13 is suppressed or stopped.

Specifically, actively promoting the adaptive operation in the adaptive filter 13 means controlling the adaptive filter 13 to update the later-described coefficient so as to generate a cancellation signal for canceling the echo component within a short time at the first speed. Suppressing the adaptive operation in the adaptive filter 13 means controlling the adaptive filter 13 to update the coefficient over a long time at the second speed slower than the first speed. Stopping the adaptive operation in the adaptive filter 13 means controlling not to update the coefficient (to maintain the coefficient).

Figure 15:
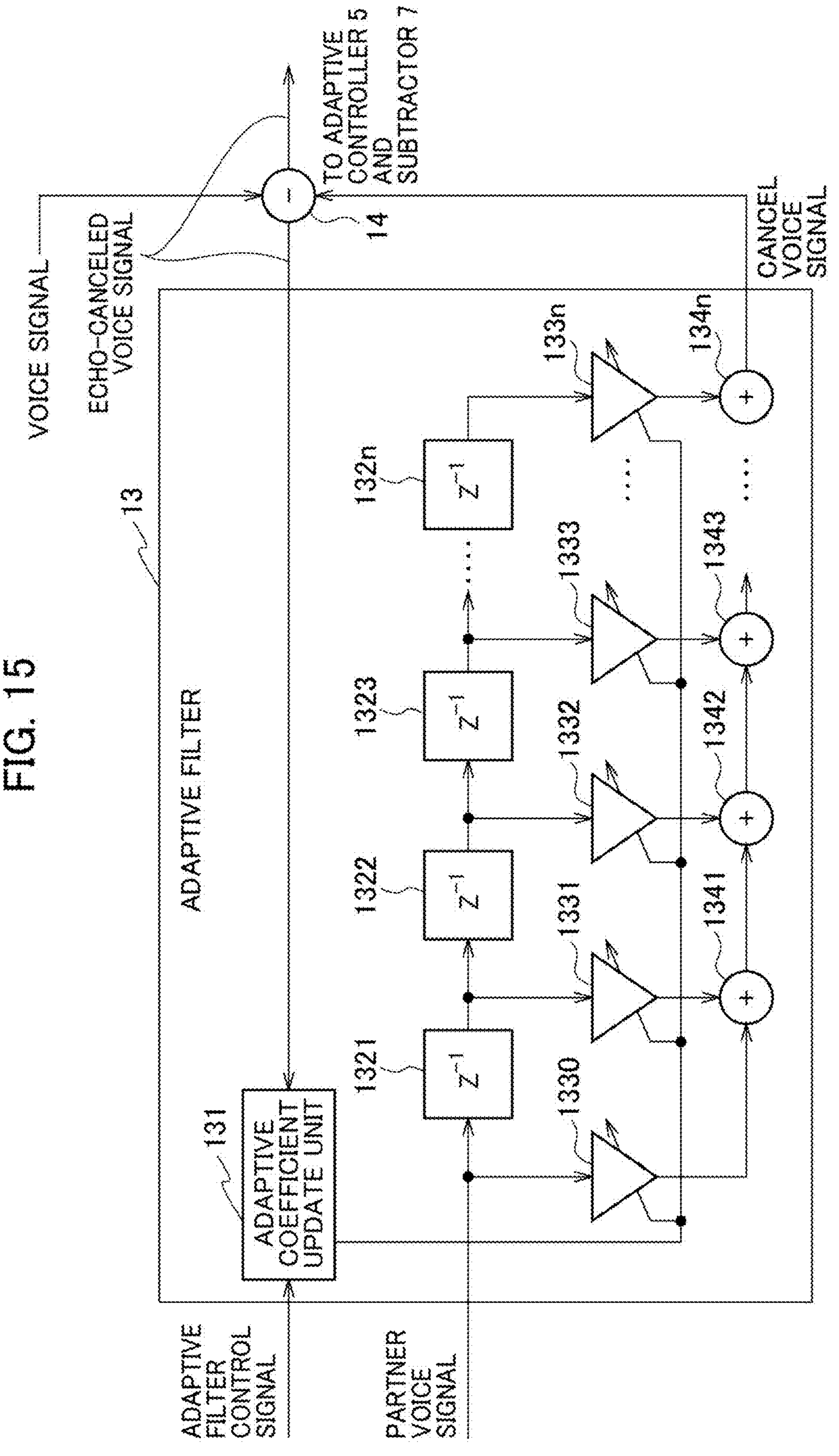
FIG. 15 is a block diagram illustrating a specific configuration example of an adaptive filter 13 in FIG. 12.

FIG. 15 shows a specific configuration example of the adaptive filter 13 using the FIR filter. The adaptive filter 13 includes an adaptive coefficient update unit 131, a delay unit 1321 to 132*n*, a multiplier 1330 to 133*n*, and an adder 1341 to 134*n*. n is a number of tens to hundreds. The delay unit 1321 to 132*n* delays and outputs each sample of the input digital partner voice signal by one clock. The multiplier 1330 to 133*n* multiplies each sample input to the delay unit 1321 and each sample output from the delay unit 1321 to 132*n* by a coefficient and outputs them.

The adder 1341 to 134*n* adds the outputs of the multipliers 1330 and 1331, the outputs of the adder 1341 and the multiplier 1332, the outputs of the adder 1342 and the multiplier 1333, . . . , the adder 134 (n−1) (not shown) and the outputs of the multiplier 133*n*, respectively. Thus, the adder 134*n* outputs a cancel voice signal for canceling the echo component from the voice signal superimposed by the echo component.

The subtractor 14 subtracts the cancel voice signal from the voice signal superimposed with the echo component output from the A/D converter 2 and outputs the echo-canceled voice signal. The adaptive coefficient update unit 131 updates the coefficient that multiplier 630 to 63*n* multiplies to the input sample so as to generate the cancel voice signal in which the echo component remains as little as possible.

At this time, the adaptive coefficient update unit 131 updates the coefficient to be supplied to the multiplier 1330 to 133*n* in a short time when the adaptive filter control signal is high, indicating "active". The adaptive coefficient update unit 131 updates the coefficient to be supplied to the multiplier 1330 to 133*n* over a long time or does not update the coefficient when the adaptive filter control signal is low, indicating "saving".

Figure 16:
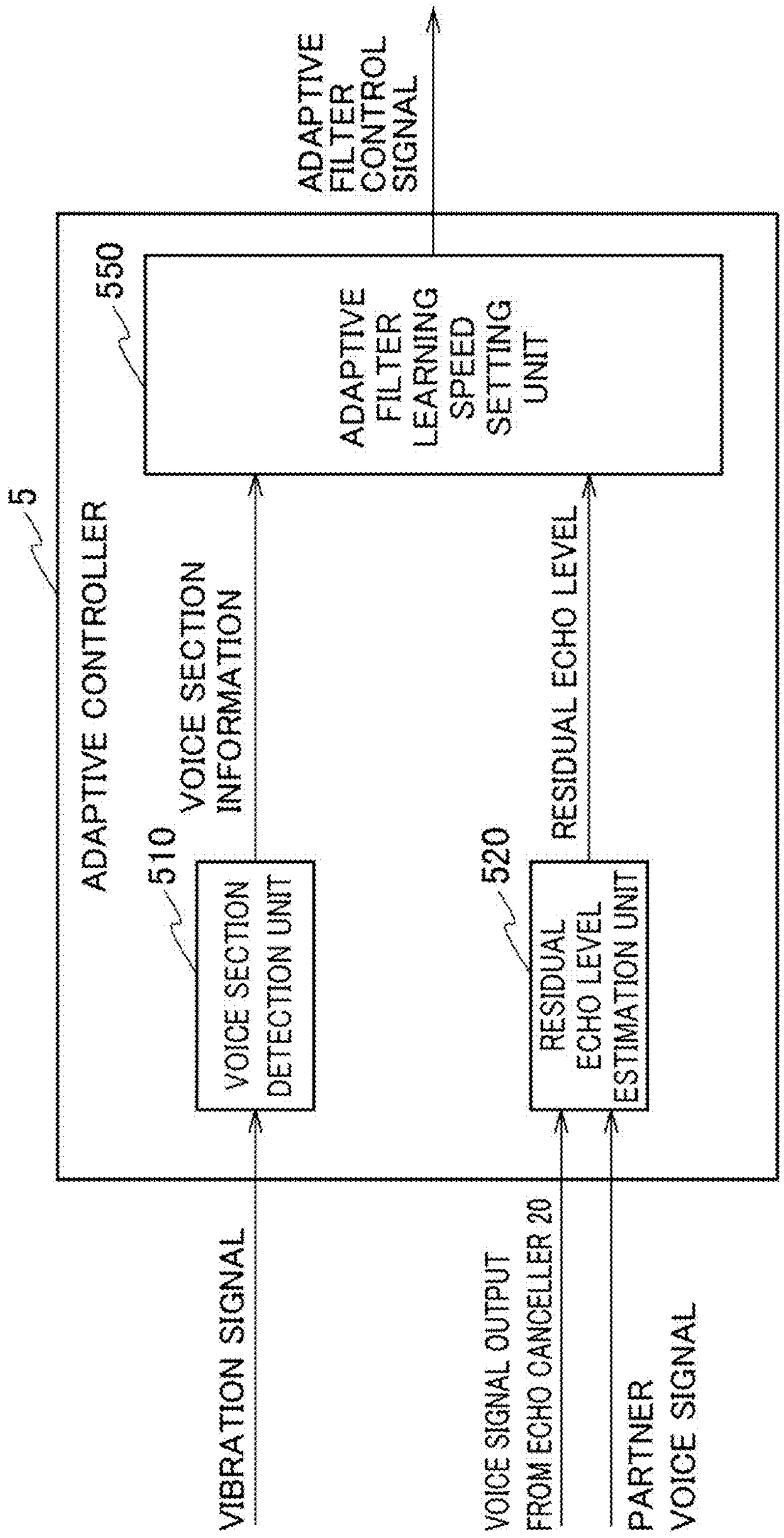
FIG. 16 is a block diagram illustrating a specific first configuration example of the adaptive controller 5 in FIG. 11.

FIG. 16 shows a specific first configuration example of the adaptive controller 5. As shown in FIGS. 11 and 16, in addition to the voice signal and vibration signal output from the echo canceller 20, the partner voice signal supplied from the line 11 is input to the adaptive controller 5. The adaptive controller 5 includes a voice section detection unit 510, a residual echo level estimation unit 520, and an adaptive filter learning speed setting unit 550.

The voice section detection unit 510 detects the voice section of the vibration signal by a technique called VAD, and supplies the voice section information to the adaptive filter learning speed setting unit 550. The voice section detection unit 510 detects the voice section according to whether at least the sound pressure level exceeds a predetermined level. The voice signal output from the echo canceller 20 and the partner voice signal are input to the residual echo level estimation unit 520. The residual echo level estimation unit 520 estimates the residual echo level remaining in the target signal by calculating a relative sound pressure level ratio per predetermined unit time between the sound pressure level of the partner voice signal and the sound pressure level of the voice signal output from the echo canceller 20. The predetermined unit time is, for example, several milliseconds or tens of milliseconds. The residual echo level estimation unit 520 supplies the residual echo level to the adaptive filter learning speed setting unit 550.

The adaptive filter learning speed setting unit 550 generates an adaptive filter control signal for setting the learning speed as active and supplies it to the adaptive filter 6 when the voice section information indicates the voice section of the user and the first condition that the residual echo level is less than or equal to a predetermined threshold is satisfied. The adaptive filter learning speed setting unit 550 generates an adaptive filter control signal for setting the learning speed as save and supplies it to the adaptive filter 6 when the first condition is not satisfied.

"The learning speed is active" means that the adaptive operation in the adaptive filter 6 is actively promoted, and "the learning speed is saving" means that the adaptive operation in the adaptive filter 6 is suppressed or stopped.

Specifically, "the adaptive operation in the adaptive filter 6 is actively promoted" means that the adaptive filter 6 controls to update the coefficient (described below) which multiplies the vibration signal within a short time at the third speed. Suppressing the adaptive operation in the adaptive filter 6 means controlling the adaptive filter 6 to update the coefficient over a long time at the fourth speed which is slower than the third speed. Stopping the adaptive operation in the adaptive filter 6 means controlling the adaptive filter 6 not to update the coefficient (to maintain the coefficient). The third speed may be the same or different from the first speed, and the fourth speed may be the same or different from the second speed.

When the voice section information does not indicate the voice section of the user, the learning speed is set as saving since no voice signal is present as a target signal. When the voice section information indicates the voice section of the user but the residual echo level exceeds the threshold, the learning speed is set as saving since the quality of the converted voice signal may be deteriorated by the presence of the residual echo component. A threshold to be compared with the residual echo level that does not deteriorate the quality of the converted voice signal by the adaptive filter 6 may be measured in advance and stored in the storage unit.

Figure 17:
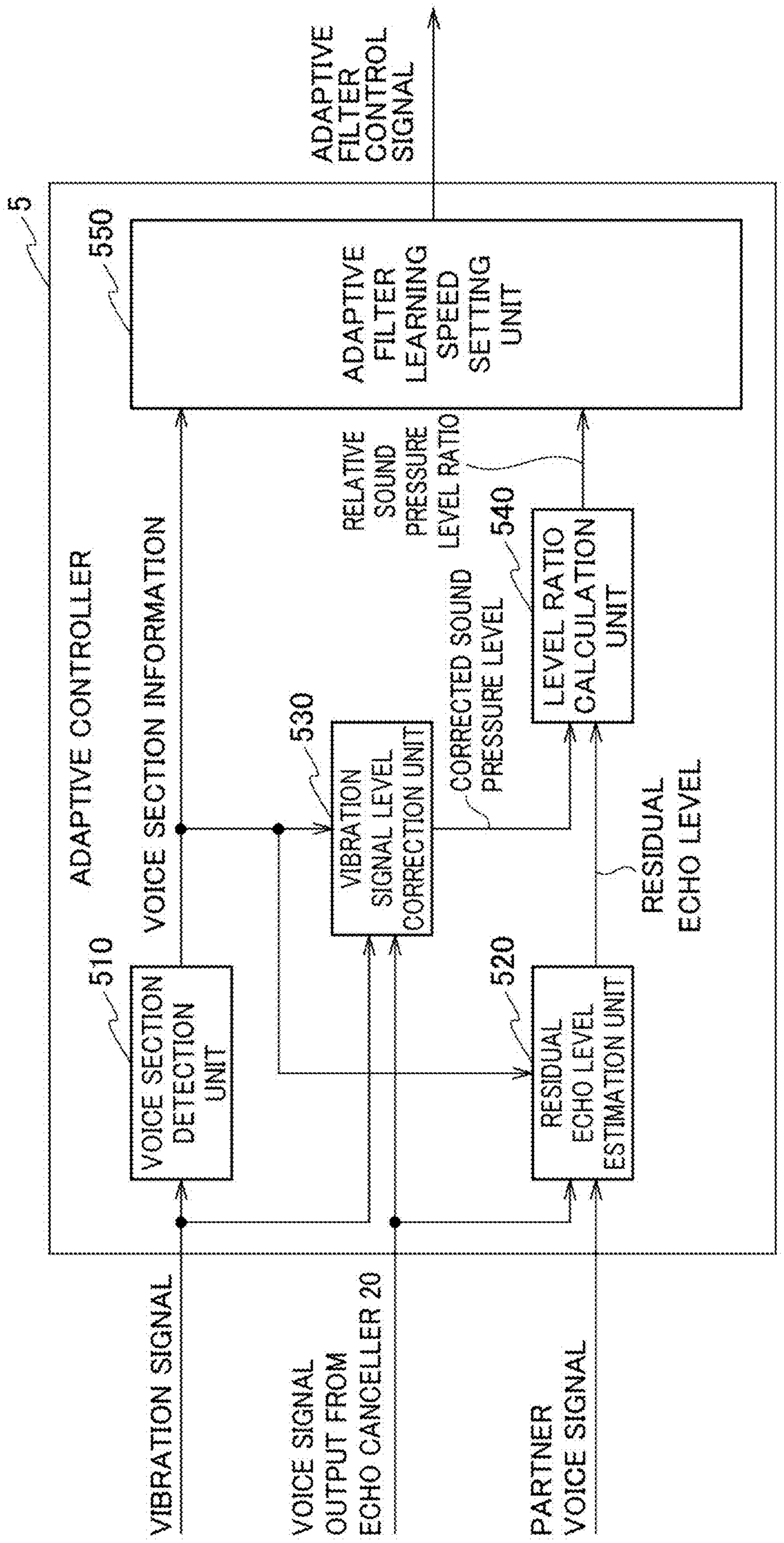
FIG. 17 is a block diagram illustrating a specific second configuration example of the adaptive controller 5 in FIG. 11.

FIG. 17 shows a specific second configuration example of the adaptive controller 5. The adaptive controller 5 includes a voice section detection unit 510, a residual echo level estimation unit 520, a vibration signal level correction unit 530, a level ratio calculation unit 540, and an adaptive filter learning speed setting unit 550. In FIG. 17, the same parts as those in FIG. 16 are denoted by the same reference signs, and the description thereof may be omitted.

The voice section information of the vibration signal output from the voice section detection unit 510, the vibration signal, and the voice signal output from the echo canceller 20 are input to the vibration signal level correction unit 530. The vibration signal level correction unit 530 calculates the relative sound pressure level ratio between the vibration signal and the voice signal output from the echo canceller 20 per predetermined unit time in the voice section of the vibration signal. The vibration signal level correction unit 530 outputs a corrected sound pressure level obtained by correcting the sound pressure level of the vibration signal to a sound pressure level corresponding to the sound pressure level of the voice signal based on the relative sound pressure level ratio. The predetermined unit time is several milliseconds or tens of milliseconds, for example.

The voice signal collected by the microphone 1 may include an echo component or environmental noise. A relatively accurate sound pressure level of the voice signal that is not affected by the echo component or environmental noise can be obtained when the sound pressure level of the vibration signal is corrected to a sound pressure level corresponding to the sound pressure level of the voice signal.

The voice signal output from the echo canceller 20, the partner voice signal, and the voice section information of the vibration signal are input to the residual echo level estimation unit 520 shown in FIG. 17. In the same manner as the voice section detection unit 121, the residual echo level estimation unit 520 detects the voice section of the partner voice signal by a technique called VAD to generate the partner voice section information, and detects the sound pressure level of the partner voice signal to generate the partner voice pressure information.

When the voice section information of the vibration signal indicates the non-voice section of the user and the partner voice section information indicates the voice section of the partner voice signal, the microphone 1 does not collect the voice emitted by the user but only the echo, so that the voice signal output from the echo canceller 20 includes only the echo component.

Then, the residual echo level estimation unit 520 calculates the relative sound pressure level ratio between the partner sound pressure information and the voice signal output from the echo canceller 20 per predetermined unit time when the voice section information of the vibration signal indicates the non-voice section of the user and the partner voice section information indicates the voice section of the partner voice signal. The predetermined unit time here is also about several milliseconds or tens of milliseconds, for example. The relative sound pressure level ratio calculated by the residual echo level estimation unit 520 corresponds to the estimated residual echo level. In this way, the residual echo level estimation unit 520 estimates the residual echo level.

The residual echo level output from the residual echo level estimation unit 520 and the corrected sound pressure level output from the vibration signal level correction unit 530 are input to the level ratio calculation unit 540. The level ratio calculation unit 540 divides the corrected sound pressure level by the residual echo level to calculate a relative sound pressure level ratio between the corrected sound pressure level and the residual echo level. The residual echo level included in the voice signal collected by the microphone 1 is estimated in advance by the residual echo level estimation unit 520. The corrected sound pressure level corresponding to the sound pressure level of the voice signal based on the vibration signal is obtained by the vibration signal level correction unit 530.

Therefore, the relative sound pressure level ratio calculated by the level ratio calculation unit 540 is an accurate sound pressure level ratio even in a state where the microphone 1 collects environmental noise and a state where the voice emitted by the user overlaps with the partner voice. When the relative sound pressure level ratio calculated by the level ratio calculation unit 540 exceeds a predetermined threshold, the voice signal output from the echo canceller 20 includes almost no echo component, and the echo component is canceled by the echo canceller 20. When the relative sound pressure level ratio calculated by the level ratio calculation unit 540 is less than or equal to a predetermined threshold, the voice signal output from the echo canceller 20 includes an echo component, and the echo component is not canceled by the echo canceller 20.

The adaptive filter learning speed setting unit 550 receives the voice section information output from the voice section detection unit 510 and the relative sound pressure level ratio output from the level ratio calculation unit 540. The adaptive filter learning speed setting unit 550 generates an adaptive filter control signal for setting the learning speed as active and supplies it to the adaptive filter 6 when a second condition that the voice section information indicates the voice section of the user, and that that the relative sound pressure level ratio output from the level ratio calculation unit 540 exceeds a threshold is satisfied. When the second condition is not satisfied, the adaptive filter learning speed setting unit 550 generates an adaptive filter control signal for setting the learning speed as saving and supplies it to the adaptive filter 6.

When the voice section information does not indicate the voice section of the user, the learning speed may be set as saving since no voice signal is present as a target signal. When the relative sound pressure level ratio is less than or equal to the threshold even though the voice section information indicates the voice section of the user, it is preferable to set the learning speed as saving since the quality of the converted voice signal may be deteriorated by the presence of residual echo components.

In a specific third configuration example of the adaptive controller 5 shown in FIG. 17, the partner voice section information generated by the residual echo level estimation unit 520 may be input to the adaptive filter learning speed setting unit 550. In this case, the adaptive filter learning speed setting unit 550 generates an adaptive filter control signal for setting the learning speed as active and supplies it to the adaptive filter 6 when the following third condition is satisfied: the partner voice section information indicates a non-voice section of the partner voice signal; and the voice section information indicates a voice section of the user.

The adaptive filter learning speed setting unit 550 generates an adaptive filter control signal for setting the learning speed as active and supplies it to the adaptive filter 6 when the following fourth condition is satisfied: the partner voice section information indicates a voice section of the partner voice signal; the relative sound pressure level ratio output from the level ratio calculation unit 540 exceeds a threshold; and the voice section information indicates a voice section of the user.

The adaptive filter learning speed setting unit 550 generates an adaptive filter control signal for setting the learning speed as saving and supplies it to the adaptive filter 6 when neither of the third condition nor the fourth condition is satisfied.

As a more preferable configuration, the adaptive controller 5 shown in FIG. 17 includes a vibration signal level correction unit 530, and the level ratio calculation unit 540 calculates the relative sound pressure level ratio between the vibration signal level and the residual echo level using the sound pressure level (corrected sound pressure level) of the vibration signal corrected by the vibration signal level correction unit 530 as the vibration signal level. For simplicity, the vibration signal level correction unit 530 may be omitted in a specific fourth configuration example of the adaptive controller 5. In this case, the level ratio calculation unit 540 may calculate the level ratio between the vibration signal level indicating the sound pressure level of the vibration signal and the residual echo level. In addition, the threshold of the level ratio between the vibration signal level and the residual echo level estimated that the sound pressure level of the vibration signal is sufficiently high to maintain the quality of the converted voice signal by the adaptive filter 6 may be measured in advance and stored in the storage unit.

The adaptive filter learning speed setting unit 550 generates an adaptive filter control signal for setting the learning speed as active and supplies it to the adaptive filter 6 when the following fifth condition is satisfied: the voice section information indicates the user voice section; and the level ratio calculated by the level ratio calculating unit 540 exceeds a predetermined threshold. The adaptive filter learning speed setting unit 550 generates an adaptive filter control signal for setting the learning speed as saving and supplies it to the adaptive filter 6 when the fifth condition is not satisfied.

In FIG. 11, the subtractor 7 supplies the difference between the converted voice signal output from the adaptive filter 6 and the voice signal output from the echo canceller 20 as a residual signal to the adaptive filter 6.

Figure 18:
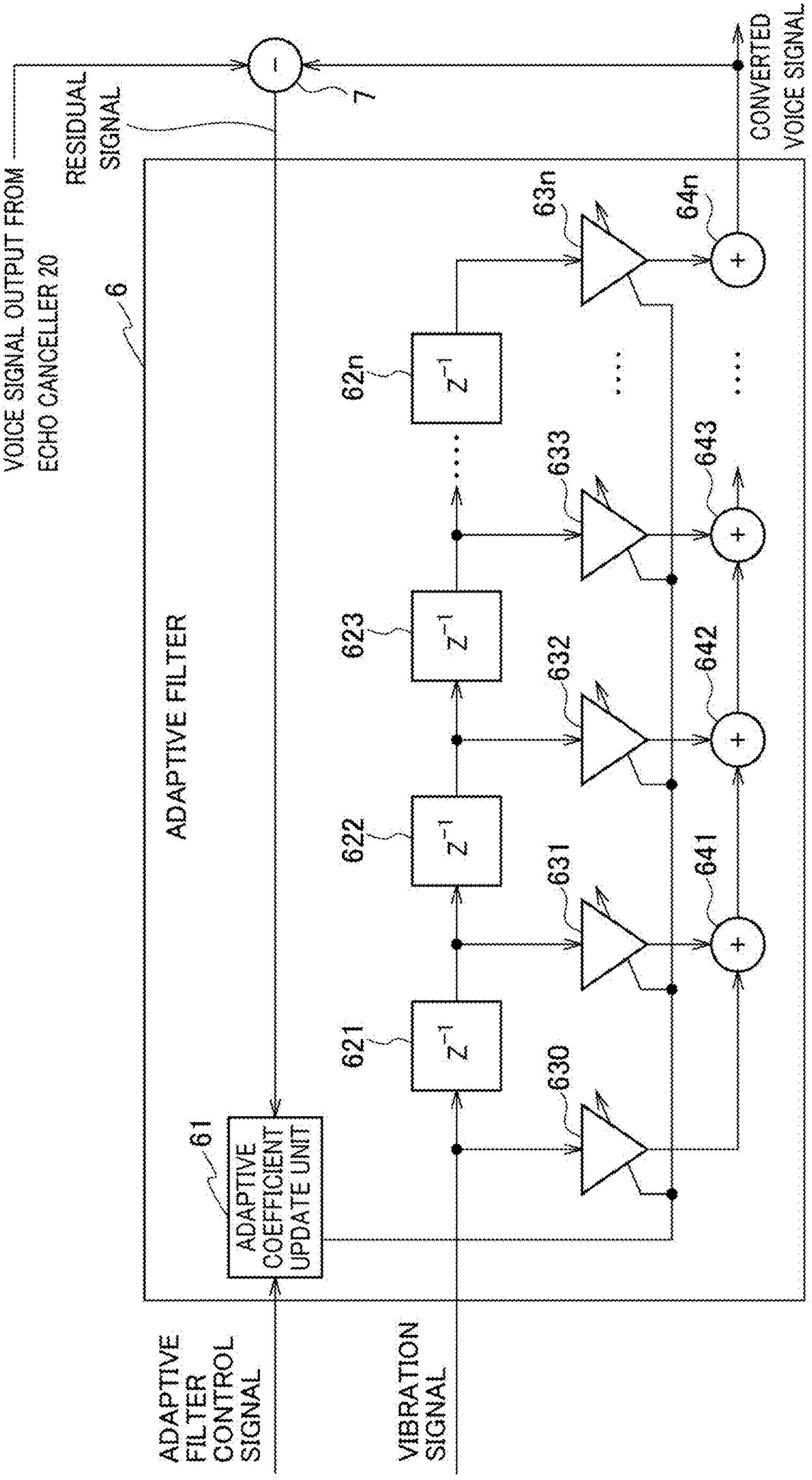
FIG. 18 is a block diagram illustrating a specific configuration example of an adaptive filter 6 in FIG. 11.

FIG. 18 shows a specific configuration example of the adaptive filter 6 using the FIR filter. The adaptive filter 6 of the sound collecting device 200 includes the same configuration as the adaptive filter 6 of the sound collecting device 100. The adaptive filter 6 includes an adaptive coefficient update unit 61, a delay unit 621 to 62*n*, a multiplier 630 to 63*n*, and an adder 641 to 64*n*. n is a number of tens to hundreds. The delay unit 621 to 62*n* delays and outputs each sample of the input digital vibration signal by one clock. The multiplier 630 to 63*n* multiplies each sample input to the delay unit 621 and each sample output from the delay unit 621 to 62*n* by a coefficient and outputs.

The adder 641 to 64*n* adds the outputs of the multipliers 630 and 631, the outputs of the adder 641 and the multiplier 632, the outputs of the adder 642 and the multiplier 633, . . . , the outputs of the adder 64 (n−1) (not shown) and the multiplier 63*n*, respectively. As a result, the adder 64*n* outputs a converted voice signal obtained by correcting the vibration signal output from the A/D converter 4 to be closer to the voice signal output from the echo canceller 20.

The subtractor 7 outputs a residual signal that is the difference between the converted voice signal output from the adder 64*n* and the voice signal output from the echo canceller 20. The adaptive coefficient update unit 61 updates the coefficient that multiplier 630 to 63*n* multiplies to the input samples so that the residual signal becomes small.

At this time, when the adaptive filter control signal is high, indicating "active", the adaptive coefficient update unit 61 updates the coefficient to be supplied to the multiplier 630 to 63*n* in a short time so that the residual signal becomes small. When the adaptive filter control signal is low, indicating "saving", the adaptive coefficient update unit 61 updates the coefficient to be supplied to the multiplier 630 to 63*n* in a direction where the residual signal becomes small over a long time, or does not update the coefficient.

When the adaptive filter control signal for setting the learning speed as active is input, the adaptive filter updates a coefficient to be supplied to the multiplier 630 to 63*n* in a short time to correct the vibration signal to be closer to the voice signal. Thus, the sound collecting device 200 can immediately supply a converted voice signal having a good voice quality to the line 11.

When an adaptive filter control signal for setting the learning speed as saving is input, the adaptive filter 6 does not update the coefficient supplied to the multiplier 630 to 63*n*, or does not update it immediately, but gradually updates it over a long time. As a result, the sound collecting device 200 can supply the converted voice signal to the line 11 with the speech quality maintained, with little or no degradation of the speech quality of the converted speech signal.

The adaptive filter 6 obtains a coefficient that brings the vibration signal closer to the voice signal by learning when any of the first to fifth conditions is satisfied, and outputs a converted voice signal having good voice quality. Therefore, the adaptive filter 6 generates a converted voice signal by using a coefficient that brings the already obtained vibration signal closer to the voice signal even when none of the first to fifth conditions is satisfied, so that the converted voice signal having good voice quality can be continuously output.

Using the flowcharts shown in FIGS. 19A and 19B, a series of operations executed by the sound collecting device 200 will be described. The flowcharts shown in FIGS. 19A and 19B show operations when the adaptive controller 5 is the second configuration example shown in FIG. 17.

Figure 19A:
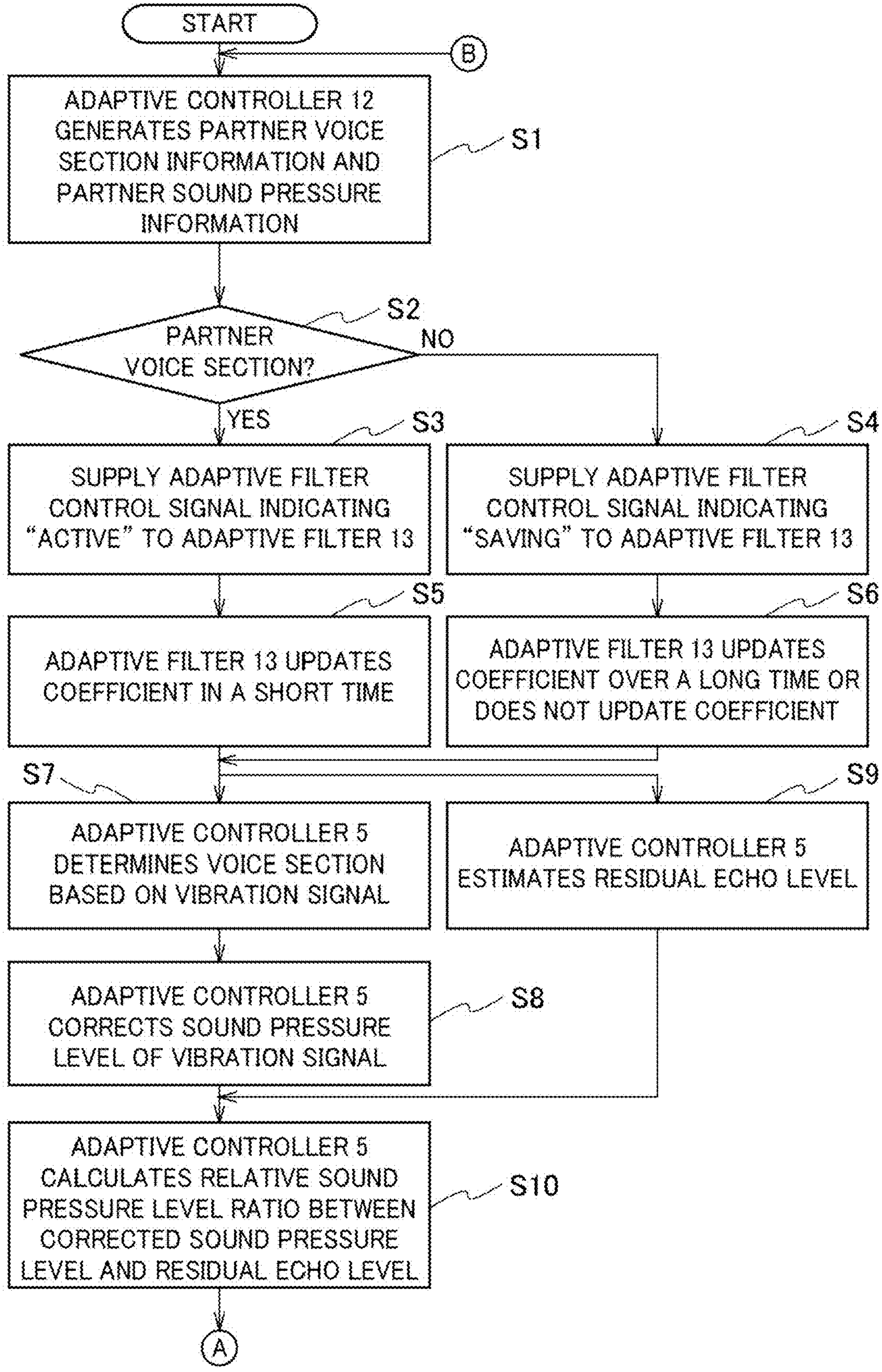
FIG. 19A is a partial flowchart illustrating the operation the sound collecting device according to a second embodiment.
Figure 19B:
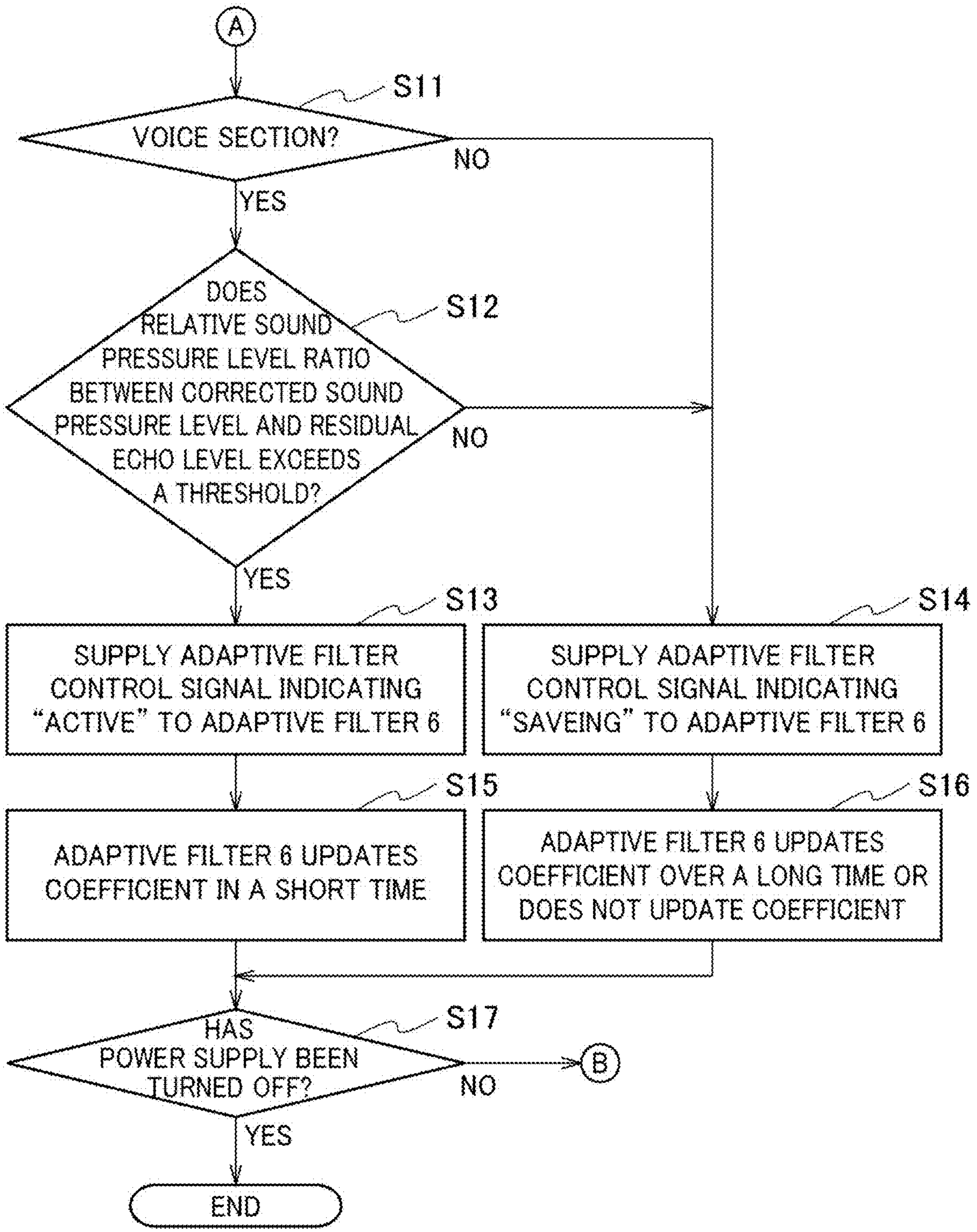
FIG. 19B is a partial flowchart following FIG. 19A illustrating the operation of the sound collecting device according to a second embodiment.

In FIG. 19A, when the power supply of the sound collecting device 200 is turned on and the processing is started, the adaptive controller 12 generates the partner voice section information and the partner sound pressure information in step S1. In step S2, the adaptive controller 12 determines whether it is the partner voice section based on the partner voice section information. When it is the partner voice section (YES), the adaptive controller 12 supplies the adaptive filter control signal indicating "active" to the adaptive filter 13 in step S3. When it is not the partner voice section (NO), the adaptive controller 12 supplies the adaptive filter control signal indicating "saving" to the adaptive filter 13 in step S4.

Following step S3, the adaptive filter 13 updates the coefficient supplied to the multiplier 1330 to 133*n* in a short time in step S5. Following step S4, the adaptive filter 13 updates the coefficient supplied to the multiplier 1330 to 133*n* over a long time or does not update the coefficient in step S6.

The adaptive controller 5 determines the voice section based on the vibration signal in step S7, and corrects the sound pressure level of the vibration signal in step S8. In parallel with steps S7 and S8, the adaptive controller 5 estimates the residual echo level in step S9. Subsequently, the adaptive controller 5 calculates the relative sound pressure level ratio between the corrected sound pressure level and the residual echo level in step S10.

In step S11 of FIG. 19B, the adaptive controller 5 determines whether it is a voice section based on the voice section information of the vibration signal. When it is a voice section (YES), the adaptive controller 5 moves the process to step S12. When it is not a voice section (NO), the adaptive controller 5 moves the process to step S14. In step S12, the adaptive controller 5 determines whether the relative sound pressure level ratio between the corrected sound pressure level and the residual echo level exceeds a threshold. When the relative sound pressure level ratio exceeds a threshold (YES), the adaptive controller 5 moves the process to step S13. When the relative sound pressure level ratio does not exceed a threshold (NO), the adaptive controller 5 shifts the process to step S14.

In step S13, the adaptive controller 5 supplies the adaptive filter control signal indicating "active" to the adaptive filter 6. In step S14, the adaptive controller 5 supplies the adaptive filter control signal indicating "saving" to the adaptive filter 6. Following step S13, the adaptive filter 6 updates the coefficient supplied to the multiplier 630 to 63*n* in a short time in step S15. Following step S14, the adaptive filter 6 updates the coefficient supplied to the multiplier 630 to 63*n* over a long time or does not update the coefficient in step S16.

In step S17 following steps S15 or S16, the sound collecting device 200 determines whether the power supply is turned off. When the power supply is not turned off (NO), the sound collecting device 200 returns the process to step S1 in FIG. 19A and repeats the processes of steps S1 to S17. When the power supply is turned off (YES), the sound collecting device 200 ends the process.

As described above, the sound collecting device 200 does not always update the coefficient to be multiplied by the converted voice signal in the adaptive filter 6 so that the residual signal becomes small in a short time. When there is a possibility that the quality of the converted voice signal deteriorates due to the presence of the residual echo component, the sound collecting device 200 performs update over a long time or not perform update. Therefore, the sound collecting device 200 can improve the quality of the voice signal (converted voice signal) based on the vibration signal generated by the vibration sensor 3.

The sound collecting device 200 can further improve the quality of the voice signal based on the vibration signal generated by the vibration sensor 3 in an environment where the echo component of the voice of the communication partner may overlap with the voice signal of the user.

The present invention is not limited to a first embodiment or a second embodiment described above, and can be modified in various ways without departing from the scope of the present invention. In FIG. 1, a portion excluding the microphone 1 and the vibration sensor 3 may be constituted by a microcomputer. In this case, in the sound collecting device 100, the computer program (sound collecting program) stored in the non-temporary storage medium causes the central processing unit of the microcomputer to execute the selective output processing of the above-mentioned voice signal and the converted voice signal. The portion excluding the microphone 1 and the vibration sensor 3 may be composed of hardware and may be composed of an integrated circuit.

The sound collecting program according to a first embodiment should cause a computer to execute at least the following first to fourth steps. In the first step, a converted voice signal is generated by multiplying the vibration signal by a coefficient so that the vibration signal generated by the vibration sensor 3 based on vibration transmitted to the human body is corrected to be closer to the voice signal which is based on air vibration generated by the microphone 1. In the second step, a residual signal, which is a difference between the voice signal and the converted voice signal, is generated.

In the third step, when it is determined to be a voice section where voice is present, the coefficient is updated so that the residual signal becomes small at the first speed. In the fourth step, when it is determined to be a non-voice section where the voice is not present, the coefficient is updated so that the residual signal becomes small at the second speed slower than the first speed, or the coefficient is maintained without updating. The sound collecting program of a first embodiment may further cause the computer to execute the fifth step of selecting the voice signal and the converted voice signal or outputting a mixture of both.

In the second and third configuration examples of the adaptive controller 5 shown in FIG. 11, the residual echo level estimation unit 520 generates partner voice section information. The partner voice section information used by the adaptive controller 5 may be generated outside the adaptive controller 5. The partner voice section information generated by the voice section detection unit 121 provided by the adaptive controller 12 shown in FIG. 14 may be input to the adaptive controller 5. The residual echo level estimation unit 520 generates partner sound pressure information, which may be generated outside the adaptive controller 5. A sound pressure information detection unit for detecting the sound pressure level of the partner voice signal may be provided in the adaptive controller 12, and the partner sound pressure information generated by the sound pressure information detection unit may be input to the adaptive controller 5.

In FIG. 11, a selector may be provided for selecting the voice signal output from the echo canceller 20 and the converted voice signal output from the adaptive filter 6 and supplying to the line 11. An environmental noise analyzer may be provided, which analyzes whether environmental noise is superimposed on the voice signal generated by the microphone 1, and the selector may select the voice signal output from the echo canceller 20 when the environmental noise is not superimposed, and select the converted voice signal when the environmental noise is superimposed.

In FIG. 11, portions excluding the microphone 1, vibration sensor 3, line 11, and speaker 16 may be included in a microcomputer. In this case, in the sound collecting device 200, a computer program (sound collecting program) stored in a non-temporary storage medium causes a central processing unit of the microcomputer to execute the aforementioned processing. The portion excluding the microphone 1, vibration sensor 3, line 11, and speaker 16 may be composed of hardware and may be composed of an integrated circuit.

The sound collecting program according to a second embodiment should cause the computer to execute at least the following first to fourth steps. In the first step, an echo component superimposed on the first voice signal, which is based on air vibration generated by the microphone 1, by the microphone 1 collecting the sound reproduced by the speaker 16 by the second voice signal transmitted from the communication partner and received via the line is suppressed.

In the second step, the first voice signal with the echo component suppressed as a target signal and a converted speech signal is generated by multiplying the vibration signal by a coefficient, so that the vibration signal generated by the vibration sensor 3 based on the vibration transmitted to the human body by speech is brought closer to the target signal. In the third step, a residual signal, which is a difference between the target signal and the converted voice signal, is generated. In the fourth step, the coefficient to be multiplied by the vibration signal is updated so that the residual signal becomes small.

What is claimed is:

1. A sound collecting device comprising:

a microphone configured to generate a voice signal based on air vibration;

a vibration sensor configured to generate a vibration signal based on vibration transmitted to a human body by speech;

an adaptive filter configured to set the first voice signal as a target signal, and to generate a converted voice signal by multiplying the vibration signal by a coefficient to bring the vibration signal closer to the target signal;

a subtractor configured to generate a residual signal that is a difference between the target signal and the converted voice signal; and an adaptive controller configured to control the adaptive filter to update the coefficient to be multiplied by the vibration signal so that the residual signal becomes small, wherein when it is determined to be a voice section where voice is present, the adaptive controller is configured to generate to supply to the adaptive filter an adaptive filter control signal that controls the adaptive filter to update the coefficient so that the residual signal becomes small at a first speed, wherein when it is determined to be a non-voice section where the voice is not present, the adaptive controller is configured to generate to supply to the adaptive filter an adaptive filter control signal that controls the adaptive filter to update the coefficient so that the residual signal becomes small at a second speed slower than the first speed, or not to update the coefficient, wherein the adaptive controller is configured to generate an adaptive filter control signal that controls the adaptive filter to update the coefficient at the first speed when a first condition is satisfied that a voice section detected based on at least one of the voice signal and the vibration signal is present, and an environmental noise level based on a sound pressure level ratio between the voice signal and the vibration signal is less than or equal to a first threshold, and wherein the adaptive controller is configured to generate an adaptive filter control signal that controls the adaptive filter to update the coefficient at the second speed or not to update the coefficient when the first condition is not satisfied.

2. A sound collecting device comprising:

a microphone configured to generate a voice signal based on air vibration;

a vibration sensor configured to generate a vibration signal based on vibration transmitted to a human body by speech;

an adaptive filter configured to set the voice signal as a target signal, and to generate a converted voice signal by multiplying the vibration signal by a coefficient to bring the vibration signal closer to the target signal;

a subtractor configured to generate a residual signal that is a difference between the target signal and the converted voice signal; and an adaptive controller configured to control the adaptive filter to update the coefficient to be multiplied by the vibration signal so that the residual signal becomes small, wherein when it is determined to be a voice section where voice is present, the adaptive controller is configured to generate to supply to the adaptive filter an adaptive filter control signal that controls the adaptive filter to update the coefficient so that the residual signal becomes small at a first speed, wherein when it is determined to be a non-voice section where the voice is not present, the adaptive controller is configured to generate to supply to the adaptive filter an adaptive filter control signal that controls the adaptive filter to update the coefficient so that the residual signal becomes small at a second speed slower than the first speed, or not to update the coefficient, wherein the adaptive controller is configured to generate an adaptive filter control signal that controls the adaptive filter to update the coefficient at the first speed when a second condition is satisfied that a voice section detected based on at least one of the voice signal and the vibration signal is present, and a residual relative level obtained by normalizing a residual signal, which is a difference between the voice signal and the converted voice signal, by a level of the vibration signal is less than or equal to a second threshold, and wherein the active controller is configured to generate an adaptive filter control signal that controls the adaptive filter to update the coefficient at the second speed or not to update the coefficient when the second condition is not satisfied.

3. The sound collecting device according to claim 1, wherein the adaptive controller comprises:

a voice section detection unit configured to detect a voice section based on at least one of the voice signal and the vibration signal;

a residual relative level acquisition unit configured to acquire a residual relative level obtained by normalizing a residual signal, which is a difference between the voice signal and the converted voice signal, by a level of the vibration signal; and a correlation degree calculation unit configured to calculate a correlation degree in a plurality of stages between the first voice signal and the vibration signal depending on the residual relative level acquired by the residual relative level acquisition unit.

4. The sound collecting device according to claim 1, further comprising a selector configured to select between the voice signal and the converted voice signal, or to output a mixture of the both.

5. The sound collecting device according to claim 4, further comprising an environmental noise analyzer configured to generate a selector control signal for controlling the selector and to supply to the selector so as to select the voice signal when an environmental noise level in the non-voice section based on a sound pressure level ratio between the first voice signal and the vibration signal is less than or equal to a third threshold, and to select the converted voice signal when the environmental noise level exceeds the third threshold.

6. The sound collecting device according to claim 3, further comprising a selector configured to select between the voice signal and the converted voice signal or to output a mixture of the both, wherein the selector adaptively is configured to mix to output the voice signal and the converted voice signal depending on the correlation degree calculated by the correlation degree calculating unit.

7. A sound collecting device comprising:

a microphone configured to generate a first voice signal based on air vibration;

a vibration sensor configured to generate a vibration signal based on vibration transmitted to a human body by speech;

an adaptive filter configured to set the first voice signal as a target signal, and to generate a converted voice signal by multiplying the vibration signal by a coefficient to bring the vibration signal closer to the target signal;

a subtractor configured to generate a residual signal that is a difference between the target signal and the converted voice signal, and an adaptive controller configured to control the adaptive filter to update the coefficient to be multiplied by the vibration signal so that the residual signal becomes small; and an echo canceller configured to suppress an echo component superimposed on the first voice signal by the microphone collecting a voice in which a second voice signal transmitted from a communication partner and received via a line is reproduced by a speaker, wherein when it is determined to be a voice section where voice is present, the adaptive controller is configured to generate to supply to the adaptive filter an adaptive filter control signal that controls the adaptive filter to update the coefficient so that the residual signal becomes small at a first speed, wherein when it is determined to be a non-voice section where the voice is not present, the adaptive controller is configured to generate to supply to the adaptive filter an adaptive filter control signal that controls the adaptive filter to update the coefficient so that the residual signal becomes small at a second speed slower than the first speed, or not to update the coefficient, and wherein the adaptive filter is configured to set the first voice signal whose echo component is suppressed by the echo canceller as a target signal, and to generate a converted voice signal by multiplying the vibration signal by a coefficient to bring the vibration signal closer to the target signal.

8. The sound collecting device according to claim 7, wherein the adaptive controller comprises:

a residual echo level estimation unit configured to estimate a residual echo level remaining in the target signal based on a sound pressure level of the target signal and a sound pressure level of the second voice signal transmitted from a communication partner and received via a line; and an adaptive filter learning speed setting unit configured to control the adaptive filter to update the coefficient at the first speed when a condition that the vibration signal indicates a voice section and the residual echo level is less than or equal to a predetermined threshold is satisfied, and to control the adaptive filter to update the coefficient at the second speed slower than the first speed or controls the adaptive filter not to update the coefficient when the vibration signal does not satisfy the condition.

9. The sound collecting device according to claim 7, wherein the adaptive controller comprises:

a residual echo level estimation unit configured to estimate a residual echo level remaining in the target signal based on a sound pressure level of the target signal and a sound pressure level of the second voice signal;

a level ratio calculation unit configured to calculate a level ratio between a vibration signal level indicating a sound pressure level of the vibration signal and the residual echo level; and an adaptive filter learning speed setting unit configured to control the adaptive filter to update the coefficient at the first speed when a condition that the vibration signal indicates a voice section and the level ratio exceeds a predetermined threshold is satisfied, and to control the adaptive filter to update the coefficient at the second speed slower than the first speed or not to update the coefficient when the condition is not satisfied.

10. The sound collecting device according to claim 9, wherein the adaptive controller further comprises a vibration signal level correction unit configured to calculate a relative sound pressure level ratio between the vibration signal and the target signal in the voice section of the vibration signal, and to correct the sound pressure level of the vibration signal to a sound pressure level corresponding to the sound pressure level of the first voice signal based on the relative sound pressure level ratio; and the level ratio calculation unit is configured to calculate the relative sound pressure level ratio between the vibration signal level and the residual echo level using the sound pressure level of the vibration signal corrected by the vibration signal level correction unit as the vibration signal level.

* * * * *